United States Patent
Kim et al.

(10) Patent No.: US 7,300,209 B2
(45) Date of Patent: Nov. 27, 2007

(54) AERODYNAMIC BEARING ASSEMBLY FOR SPINDLE MOTOR FOR HARD DISK DRIVES

(75) Inventors: Sang Uk Kim, Seoul (KR); Beom Young Myung, Daejeon (KR)

(73) Assignee: G & W Technologies Inc., Inchoeon (KR)

(*) Notice: Subject to any disclaimer, the term of this patent is extended or adjusted under 35 U.S.C. 154(b) by 727 days.

(21) Appl. No.: 10/496,810

(22) PCT Filed: Nov. 28, 2002

(86) PCT No.: PCT/KR02/02232

§ 371 (c)(1),
(2), (4) Date: May 27, 2004

(87) PCT Pub. No.: WO03/046907

PCT Pub. Date: Jun. 5, 2003

(65) Prior Publication Data

US 2005/0013514 A1    Jan. 20, 2005

(30) Foreign Application Priority Data

Nov. 29, 2001  (KR)  ............ 10-2001-0074910

(51) Int. Cl.
  *F16C 21/00*  (2006.01)
  *F16C 27/00*  (2006.01)
(52) U.S. Cl. ............... 384/126; 384/100; 384/107; 310/90; 360/99.08

(58) Field of Classification Search ............... 384/100, 384/107, 111, 112, 113, 114, 121, 123, 126, 384/245, 610; 360/99.08, 99.07; 310/90
See application file for complete search history.

(56) References Cited

U.S. PATENT DOCUMENTS

| | | | | |
|---|---|---|---|---|
| 5,373,407 A | * | 12/1994 | Stupak et al. ............ | 360/99.08 |
| 5,877,916 A | * | 3/1999 | Papst ...................... | 360/98.07 |
| 6,036,368 A | * | 3/2000 | Takehara et al. .......... | 384/112 |
| 6,936,944 B2 | * | 8/2005 | Kim .......................... | 310/90 |

FOREIGN PATENT DOCUMENTS

| | | |
|---|---|---|
| EP | 1074753 | 2/2001 |
| JP | 59-082664 | 5/1984 |
| KR | 20-2000-0003984 | 2/2000 |

* cited by examiner

*Primary Examiner*—Thomas R. Hannon
*Assistant Examiner*—James Pilkington
(74) *Attorney, Agent, or Firm*—Keusey, Tutunjian & Bitetto, P.C.

(57) ABSTRACT

Disclosed is an aerodynamic bearing assembly for a spindle motor for hard disk drives, in which a hub of the spindle motor is pivoted in both radial and thrust directions by the ball bearing, which directly contacts the center of the hub, to perform rotation according to the rotational principle of a whirligig, and is subject to the thrust load through the aerodynamic bearing assembly with air groove(s) without being in contact with it, so that the hub maintains a rotational center without mechanical contact resulting in noise and starting failure of the assembly during an initial starting (low-speed rotation). The assembly includes air grooves, the air groove generating aerodynamic pressure between the hub and the aerodynamic bearing while the hub rotates.

19 Claims, 14 Drawing Sheets

AERODYNAMIC BEARING ASSEMBLY FOR SPINDLE MOTOR FOR HARD DISK DRIVES

FIELD OF INVENTION

The present invention relates to a spindle motor for hard disk drives. More particularly, the present invention relates to an aerodynamic bearing assembly for a spindle motor for hard disk drives capable of pivoting a lower portion of a hub in both radial and thrust directions through use of a ball bearing, which comes into direct contact with the lower portion of the hub, so that a rotational center of the hub can be maintained without mechanical contact resulting in noise and starting problems of the aerodynamic bearing assembly during an initial starting (during low-speed rotation).

BACKGROUND ART

Generally, a hard disk drive functions as an auxiliary memory unit of a computer, and is comprised of a platter, a head, a spindle motor, a head arm and a printed circuit board. The hard disk drive helps to operate the system of a computer either by reading out and regenerating information stored at the platter through the head or by writing new information on the platter through the head.

In the construction of the above-mentioned hard disk drive, the platter is a metallic circular plate coated with magnetic material, functioning to write various data. The platter is stacked in layers and rotates about a rotatable shaft. This rotatable shaft is named a spindle shaft. A motor for rotating the spindle shaft is named a spindle motor.

The head for reading/writing data stored at the platter is connected to the head arm so as to access desired information addresses. This head arm is driven by a head actuator, which is called a voice coil motor (VCM). A conventional spindle motor will be described below.

FIG. 1 is an exploded perspective view of a conventional spindle motor for hard disk drives employing at least one ball bearing, and FIG. 2 is a cross sectional view of the spindle motor of FIG. 1.

As shown in FIGS. 1 and 2, the conventional spindle motor 10 for hard disk drives employing at least one ball bearing comprises a base 11 serving for a lower portion of the spindle motor; a spindle shaft 12 fitted at a center of the base in a vertical direction; a first ball bearing 13 fitted on a lower portion of the spindle shaft 12 positioned on the upper side of the base 11; a stator 14 fitted around the first ball bearing 13 and constructed in such a manner that a coil 14b is wound around a core 14a of the stator; a second ball bearing 15 fitted on an upper portion of the spindle shaft 12; a hub 16, being rotatable about the first and second ball bearings 13 and 15, for covering the upper portion of the base 11; and an annular permanent magnet 17 fitted on an inner circumferential surface of a lower portion of the hub 16 and generating driving force for rotating the hub 16 through use of the magnetic field produced in cooperation with the coil 14b.

In the conventional spindle motor 10 for hard disk drives constructed as mentioned above, when power is supplied to the coil 14b of the stator 14, a magnetic field (not shown) is established between the coil 14b and the permanent magnet 17. The magnetic field between the coil 14b and the permanent magnet 17 allows the hub 16 to be rotated in one direction.

However, the construction wherein the hub 16 rotates using the first and second ball bearings 13 and 15 makes it impossible to drive at a high speed with a strict rotational precision, which results in generating noise and vibration when the ball bearing rotates at a high speed. The following description will be made regarding the construction of an aerodynamic bearing shown in FIG. 3.

FIG. 3 is a cross-sectional view of a conventional spindle motor for hard disk drives employing at least one aerodynamic bearing.

The conventional spindle motor 20 for hard disk drives employing at least one aerodynamic bearing shown in FIG. 3 includes a base 21 formed as a lower portion of the spindle motor, a first ball bearing 22 fitted on an upper central portion of the base 21, a stator 23 fitted around the first ball bearing 22 and constructed in such a manner that a coil 23b is wound around a core 23a of the stator, a spindle shaft 24 fitted on an upper central portion in a vertical direction, a second bearing 25 fitted on an upper portion of the spindle shaft 24, a supported hub 26 that is rotatable about the spindle shaft 24 and constructed to cover the upper portion of the base 21, first and second aerodynamic bearings 27 and 28 fitted on an inner upper portion of the hub 26 for generating aerodynamic pressure for smoothly rotating the hub 26 about the spindle shaft 24, and a permanent magnet 27 fitted on an inner circumferential surface of a lower portion of the hub 16 for generating driving force for rotating the hub 26 through use of the magnetic field produced in cooperation with the coil 23b.

In the conventional spindle motor 20 for hard disk drives employing at least one aerodynamic bearing constructed as mentioned above, when power is supplied to the coil 23b of the stator 23, a magnetic field (not shown) is established between the coil 23b and the permanent magnet 27. The magnetic field between the coil 23b and the permanent magnet 27 allows the hub 26 to be rotated in one direction.

Once the hub 26 rotates, air begins to flow on the inner surfaces of the first and second aerodynamic bearings 27 and 28. The faster the hub 26 rotates, the stronger the air flows. As a result, the flow of air is changed into a layer of air having a predetermined rigidity between the first and second aerodynamic bearings 27 and 28, the spindle shaft 24, the first bearing 25, and the second bearing 22 in proportion to the rotational speed of the hub 26. Therefore, the hub 26 with a mounted platter (not shown) rotates about the spindle shaft 24 while overcoming the imposed load and disturbance from the air layer acting as a bearing between the spindle shaft 24 and the hub 26.

However, the conventional spindle motor for hard disk drives employing at least one aerodynamic bearing, constructed as mentioned above, enables rigidity of the air layer to be improved at a low-speed rotation, but rigidity of the air layer is maintained almost constantly without an increase in proportion to the rotational speed when the motor rotates beyond a fixed speed.

Further, the conventional spindle motor for hard disk drives employing at least one aerodynamic bearing constructed as mentioned above is designed so that the base is assembled with the first ball bearing, but the spindle shaft is assembled with the second bearing, so that the assembled two sets maintain a predetermined size of air gap with respect to the aerodynamic bearings. Therefore, there are problems in that the spindle motor has a reduced assembly capability and has a difficulty in constantly maintaining a constant thickness of the air gap. Moreover, the spindle motor is designed so that the hub is supported around the spindle shaft via the air gap without putting the hub into direct contact with the spindle shaft. Therefore, during initial starting, the spindle motor is subjected to malfunction, attrition losses of the aerodynamic bearings as well as the first and second ball bearings, noise and vibration, all of which are caused by friction.

SUMMARY OF THE INVENTION

Therefore, the present invention has been made in view of the above-mentioned problems, and it is an object of the present invention to provide an aerodynamic bearing assembly for a spindle motor for hard disk drives, in which a rotatable hub of the spindle motor for hard disk drives is adapted not only to be pivoted in both radial and thrust directions by the ball bearing coming into direct contact with the center of the hub so as to perform rotation according to the rotational principle of the whirligig, but also to be subjected to the thrust load through the aerodynamic bearing assembly with the air groove(s) without being in contact with it, so that the hub can maintain a rotational center without mechanical contact resulting in noise and starting failure of the aerodynamic bearing assembly during an initial starting (during low-speed rotation).

It is another object of the present invention to provide an aerodynamic bearing assembly for a spindle motor for hard disk drives, in which a hub, which is designed to have a conical structure like a whirligig and a rotatable point-contact supporting structure through the ball bearing, is combined with the aerodynamic bearing having at least one air groove, which is formed on at least one of the upper horizontal surface of the main bearing body of the aerodynamic bearing, the outer circumferential surface of the main bearing body of the aerodynamic bearing, the lower horizontal surface of the hub and the inner circumferential surface of the cylindrical section of the hub, so that rotational rigidity of the bearing against disturbance during high-speed rotation rather than during low-speed rotation as well as the capability of rotating without a slant are improved, and thus an excellent rotational precision can be obtained.

It is yet another object of the present invention to provide an aerodynamic bearing assembly for a spindle motor for hard disk drives, in which a hub is designed to have a conical structure like a whirligig and a rotatable point-contact supporting structure through the ball bearing, so that even though static electricity is generated by friction between the air caused by a high-speed rotation and the platter, the static electricity can be discharged through the ball bearing, thus improving a structural safety of the spindle motor.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Figure 1:
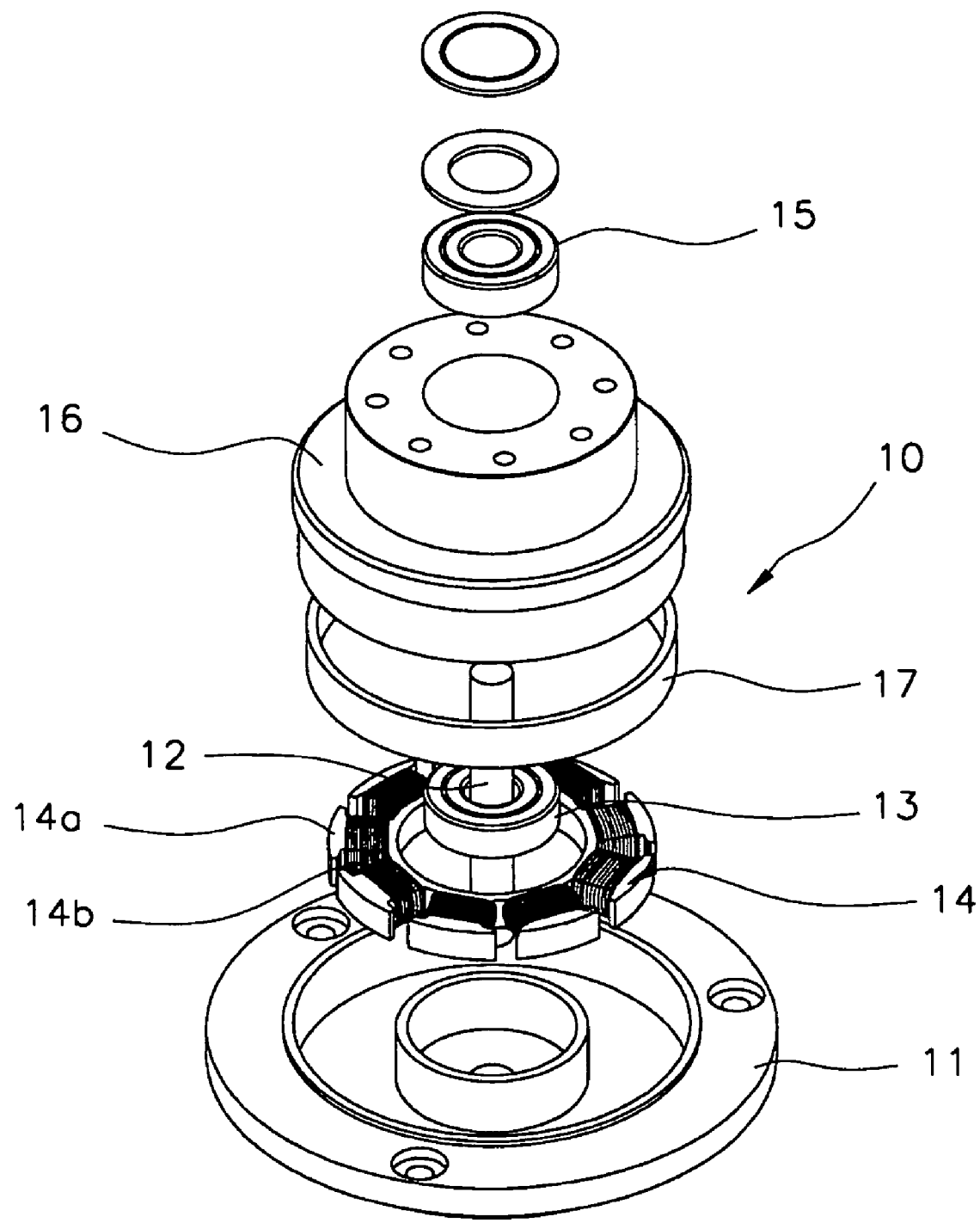
FIG. 1 is an exploded perspective view of a conventional spindle motor for hard disk drives employing at least one ball bearing.
Figure 2:
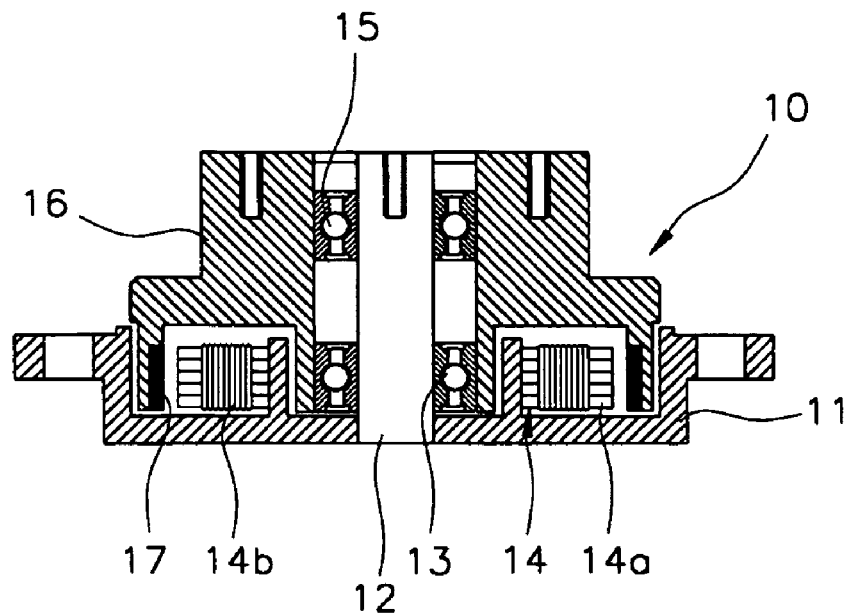
FIG. 2 is a cross-sectional view of the spindle motor of FIG. 1.
Figure 3:
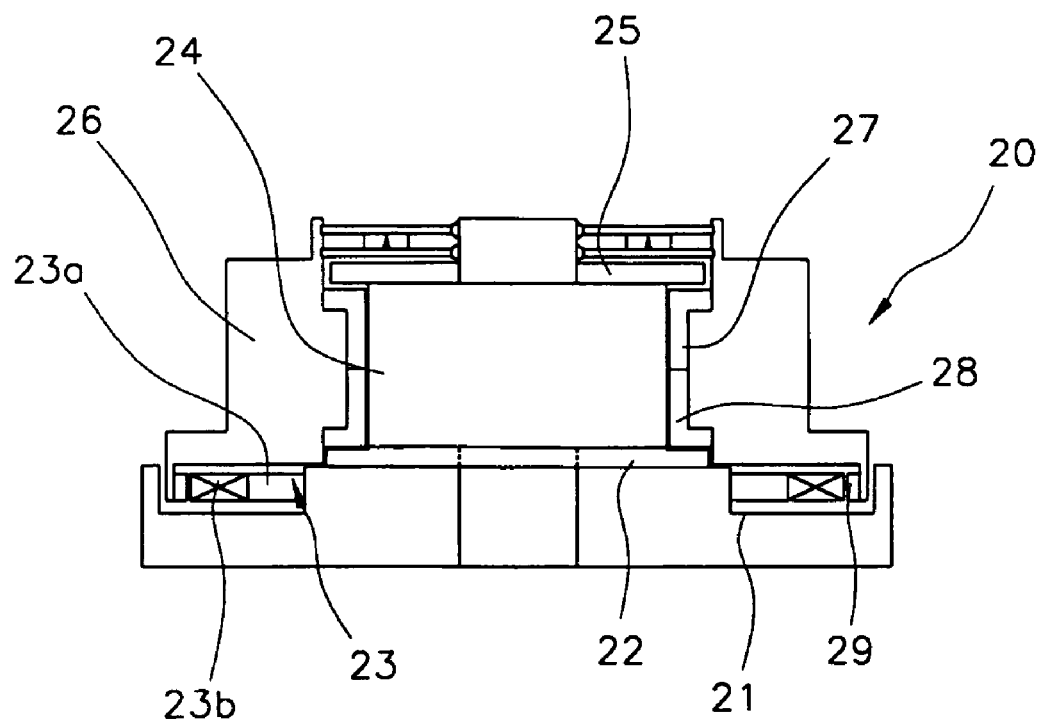
FIG. 3 is a cross-sectional view of a conventional spindle motor for hard disk drives employing at least one aerodynamic bearing.

In order to accomplish the above-mentioned objects, there is provided an aerodynamic bearing assembly employed in a spindle motor for hard disk drives, the spindle motor including a base, a hub, a stator and a permanent magnet, the base serving as a lower portion of the spindle motor, the hub being rotatably fitted on the base and able to fixedly mount a platter, the stator being formed with a plurality of cores wound around by one or more coils along an outer circumference of the stator and being formed with an open press-fit portion at the center of the stator. The permanent magnet is fitted on an inner circumferential surface of the hub and generates a magnetic field in cooperation with the coil. The aerodynamic bearing assembly comprises an aerodynamic bearing including a main bearing body formed in a concentric disk shape to serve as an upper portion of the aerodynamic bearing, and an auxiliary bearing body integrally formed on a lower portion of the main bearing body and press-fitted into the open press-fit portion of the stator to fixedly mount the stator on an outer circumferential surface of the auxiliary bearing body, the aerodynamic bearing being fixedly installed in a space between the base and the hub; and a ball bearing for rotatably pivoting a center of the hub in both radial and thrust directions at a center of the aerodynamic bearing, wherein at least one of an upper horizontal surface of the main bearing body of the aerodynamic bearing, an outer circumferential surface of the main bearing body of the aerodynamic bearing, a lower horizontal surface of the hub and a lower inner circumferential surface of the hub, is provided with at least one air groove having a predetermined depth. The air groove generates aerodynamic pressure between the hub and the aerodynamic bearing while the hub rotates.

In the above-mentioned construction, the air groove may be formed on the upper horizontal surface of the main bearing body of the aerodynamic bearing, or on the outer circumferential surface of the main bearing body of the aerodynamic bearing, or both on the upper horizontal surface of the main bearing body of the aerodynamic bearing and on the outer circumferential surface of the main bearing body of the aerodynamic bearing.

Meanwhile, the air groove may be formed on the lower horizontal surface of the hub, or on the lower inner circumferential surface of the hub, or both on the lower horizontal surface of the hub and on the lower inner circumferential surface of the hub.

Further, the air groove may be formed both on the upper horizontal surface of the main bearing body of the aerodynamic bearing and on the lower inner circumferential surface of the hub, or both on the outer circumferential surface of the main bearing body of the aerodynamic bearing and on the lower horizontal surface of the hub.

In the above-mentioned constructions, the upper horizontal surface of the main bearing body of the aerodynamic bearing may be further provided with at least one oilless bearing in a ring shape. Here, one or more air groove is formed in a predetermined depth on an upper surface of the oilless bearing.

Further, the oilless bearing may be mounted on the lower horizontal surface of the hub in a ring shape. Here, one or more air groove is formed in a predetermined depth on a lower surface of the oilless bearing.

On the other hand, at least one pair of oilless bearings opposite to each other may be formed on the upper horizontal surface of the main bearing body of the aerodynamic bearing and on the lower horizontal surface of the hub in a ring shape. Here, of the opposite oilless bearings, one, which is mounted on the upper horizontal surface of the main bearing body of the aerodynamic bearing, may be provided with an air groove on an upper surface thereof, while the other, which is mounted on the lower horizontal surface of the hub, may be provided with an air groove on a lower surface thereof.

According to the present invention, as mentioned above, the ball bearing for rotatably supporting the hub is arranged at a rotational center of the aerodynamic bearing to be at a lower position than an upper horizontal plane of the main bearing body of the aerodynamic bearing, so that the ball bearing has a rotatable supporting point at the lower position than the upper horizontal plane of the main bearing body of the aerodynamic bearing.

Alternatively, the ball bearing for rotatably supporting the hub may be arranged at a rotational center of the aerodynamic bearing to be flush with an upper horizontal plane of the main bearing body of the aerodynamic bearing, so that the ball bearing has a rotatable supporting point flush with the upper horizontal plane of the main bearing body of the aerodynamic bearing.

Further, the ball bearing for rotatably supporting the hub may be arranged at a rotational center of the aerodynamic bearing to be at a higher position than an upper horizontal plane of the main bearing body of the aerodynamic bearing, so that the ball bearing has a rotatable supporting point at the higher position than the upper horizontal plane of the main bearing body of the aerodynamic bearing.

Hereinafter, the preferred embodiments of the present invention will be described in detail with reference to the drawings.

Figure 4:
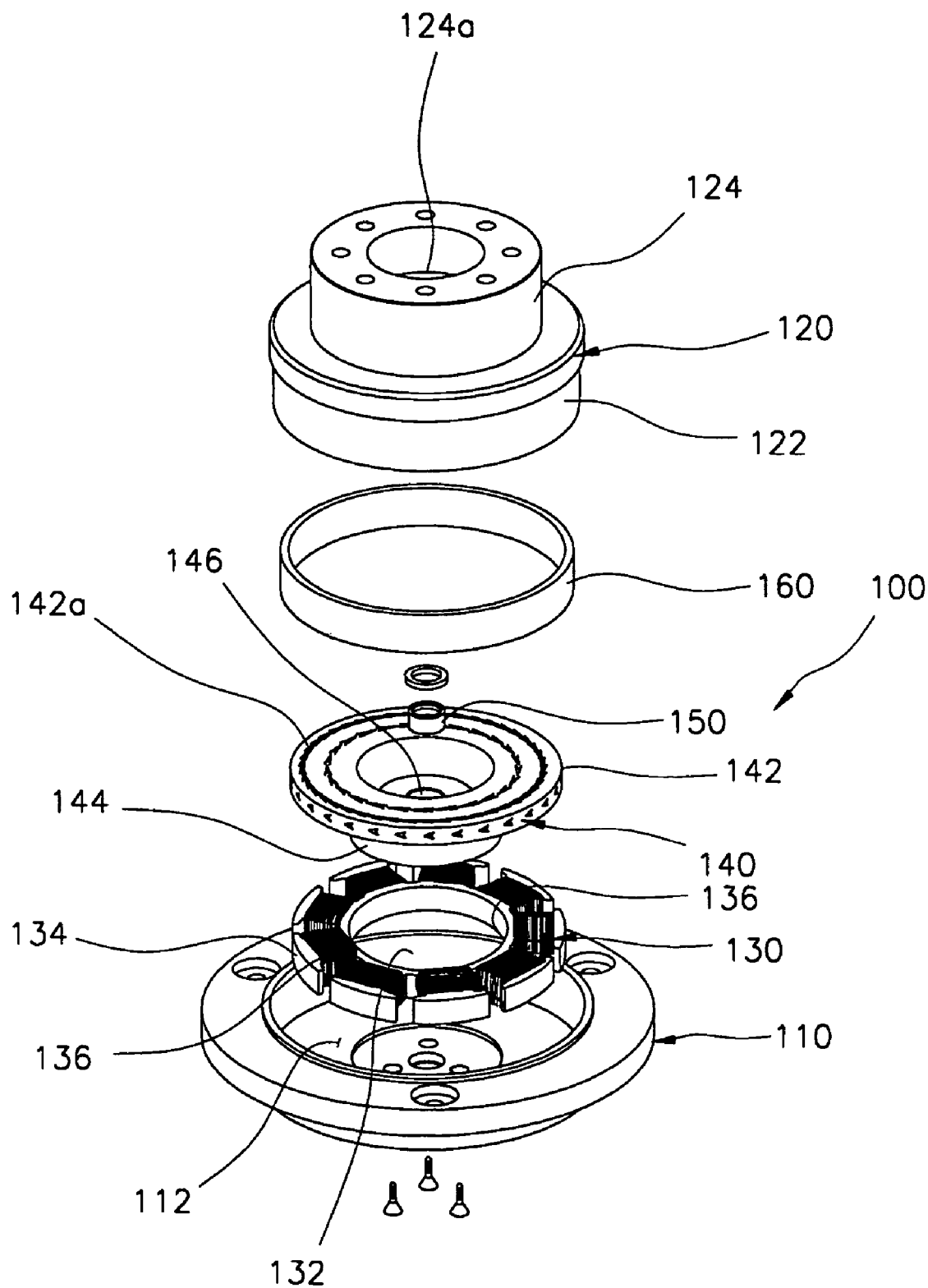
FIG. 4 is an exploded perspective view of a spindle motor for hard disk drives with a pivot structure according to the present invention.
Figure 5:
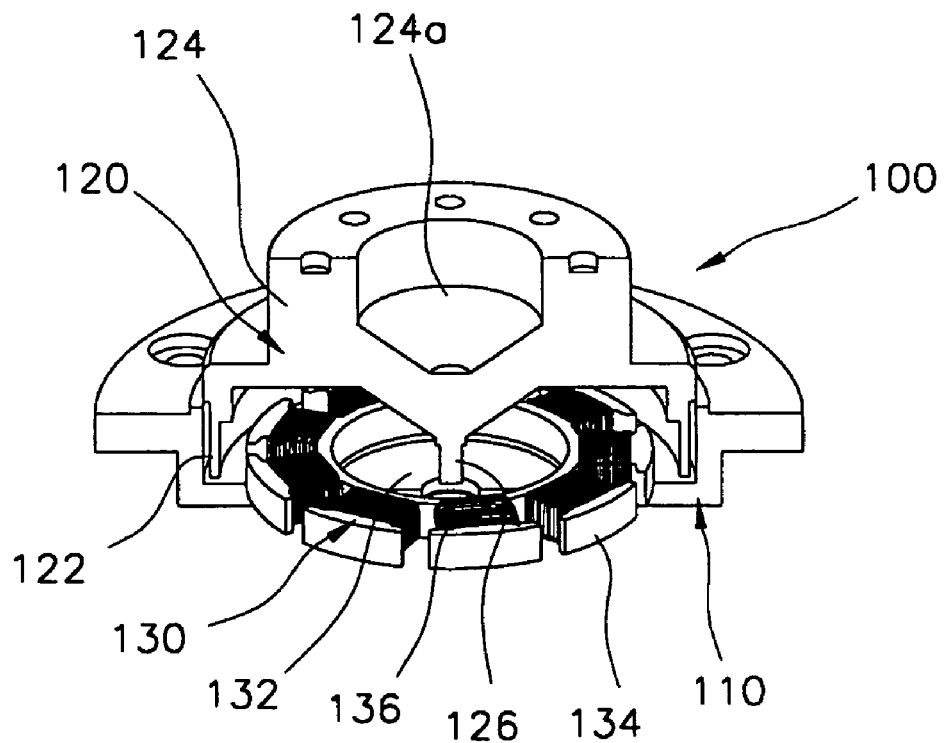
FIG. 5 is a partially sectional perspective top view of a spindle motor for hard disk drives with a pivot structure according to the present invention.
Figure 6:
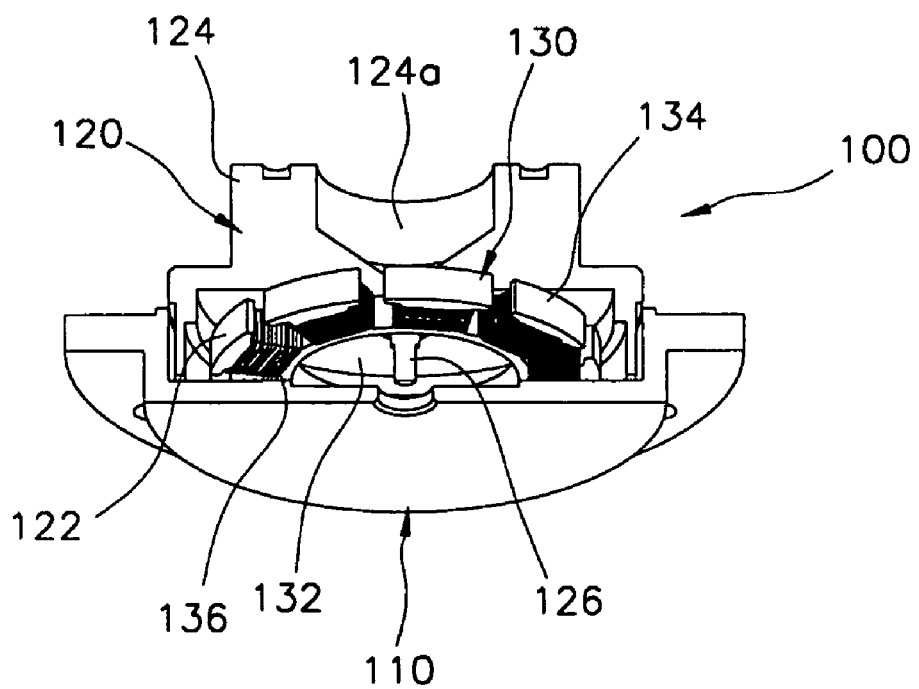
FIG. 6 is a partial sectional perspective bottom view of a spindle motor for hard disk drives with a pivot structure according to the present invention.
Figure 7:
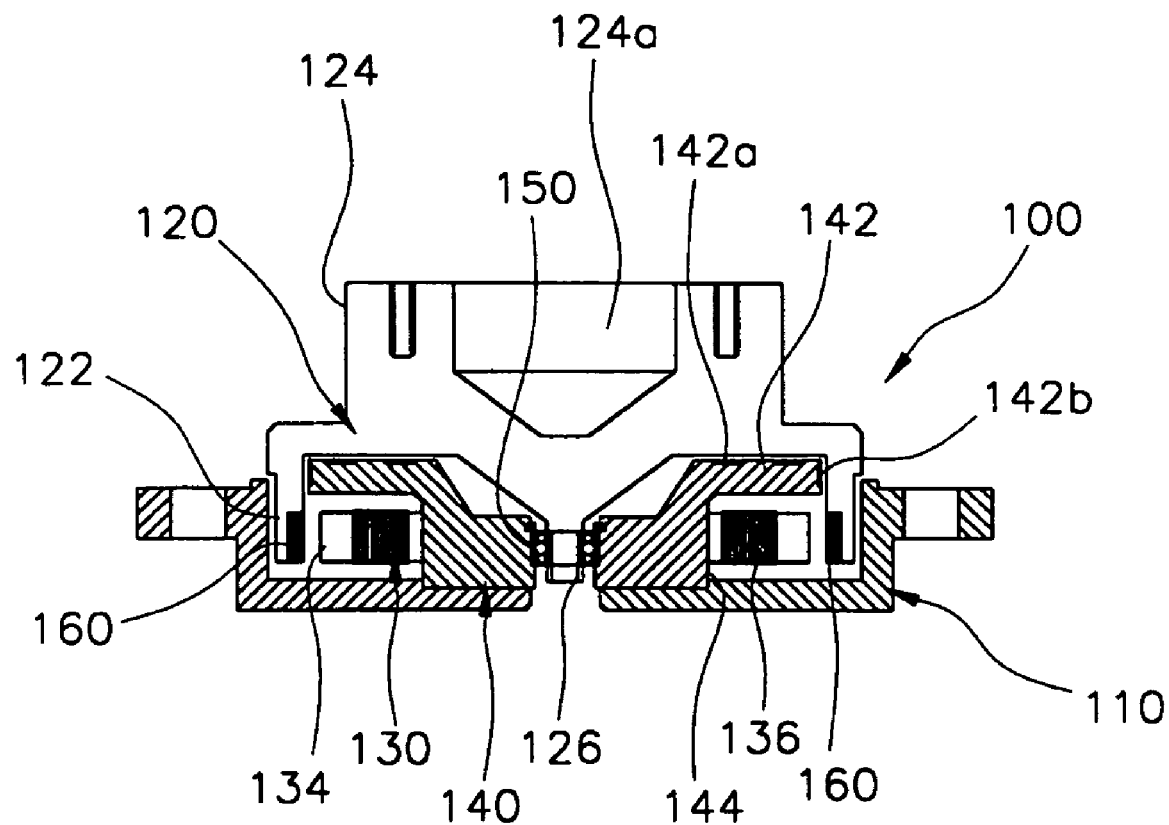
FIG. 7 is a cross-sectional view of an assembled spindle motor for hard disk drives with a pivot structure according to the present invention.
Figure 8:
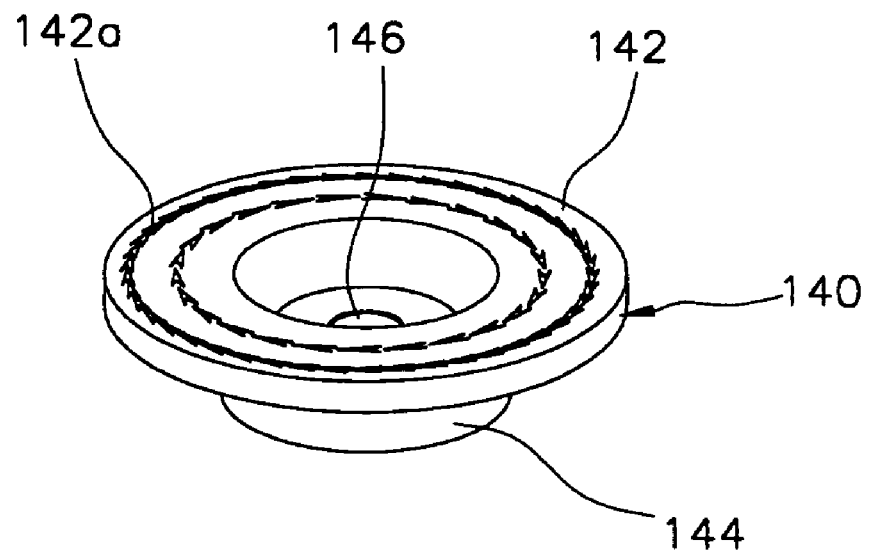
FIG. 8 is a perspective view of a first embodiment of an aerodynamic bearing assembly of a spindle motor for hard disk drives with a pivot structure according to the present invention.

FIG. 4 is an exploded perspective view of a spindle motor for hard disk drives with a pivot structure according to the present invention, FIG. 5 is a partially sectional perspective top view of a spindle motor for hard disk drives with a pivot structure according to the present invention, FIG. 6 is a partially sectional perspective bottom view of a spindle motor for hard disk drives with a pivot structure according to the present invention, FIG. 7 is a cross-sectional view of an assembled spindle motor for hard disk drives with a pivot structure according to the present invention, FIG. 8 is a perspective view of a first embodiment of an aerodynamic bearing assembly of a spindle motor for hard disk drives with a pivot structure according to the present invention.

As shown in FIGS. 4 to 8, a spindle motor 100 for a hard disk drive according to the present invention is designed to allow a center on a lower side of a hub 120 to be pivoted in both radial and thrust directions through a ball bearing 150 coming into direct contact with the lower portion of the hub, so that the hub can be rotated while maintaining a rotational center without mechanical contact between the hub 120 and an aerodynamic bearing 140 resulting in noise and starting failure caused by rotation of the hub 120 during an initial starting (or low-speed rotation) of the spindle motor 100.

That is, the spindle motor 100 for hard disk drives according to the present invention is designed so that the hub 120 is supported in a point-contact manner as a whirligig and operates on the principle of rotation of the whirligig (The faster a whirligig rotates, the more rotational inertia increases. Therefore, a whirligig rotating at a high speed tends to rotate more easily than that at a low speed. This phenomenon is derived from the law of conservation of angular momentum.), thus improving rotational rigidity of the bearing against disturbance as well as its capability of rotating without a slant. The spindle motor 100 can thus obtain a high rotation precision.

Further, the spindle motor 100 for hard disk drives according to the present invention is designed so that when the hub 120 rotates at a high speed, aerodynamic pressure is established between the aerodynamic bearing 140 in which a main bearing body 142 is provided with at least one air groove 142a, and the hub 120, thus coping with thrust load of the hub 120 and not causing the hub 120 to be in contact with the main bearing body 142 while the hub 120 is rotating at a high speed.

As mentioned above, the spindle motor 100 for hard disk drives according to the present invention is characterized by a construction combining the aerodynamic bearing 140 with the ball bearing 150, and by a construction causing the hub 120 to be supported in a point-contact manner the same as a whirligig in rotation.

The spindle motor 100 for hard disk drives according to the present invention, comprises a base 110; a hub 120 fitted rotatably on the base 110 and having a platter (not shown)

mounted on the hub; a stator 130 constructed in such a manner that an open press-fit portion 132 is provided at a center portion thereof and that at least one coil 136 is wound around a plurality of cores 134, which are formed at the same angular distance along an outer circumference of the stator; an aerodynamic bearing 140 including a disk-shaped main bearing body 142 formed with at least one air groove 142a so as to generate aerodynamic pressure in cooperation with the hub 120, and an auxiliary bearing body 144, formed integrally on the lower portion of the main bearing body 142 so as to mount on the base 100 through the open press-fit portion 132 of the stator 130; a ball bearing 150 for causing the rotational center of the hub 120 to be rotatably supported on the center of the aerodynamic bearing 140; and an annular permanent magnet 160, fitted on an inner circumferential surface of the hub 120 adjacent to the cores 134 around which the coil 136 of the stator 130 is wound, for generating driving force for rotating the hub 120 by means of a magnetic field established in cooperation with the coil 136.

When power is supplied to the spindle motor 100 for hard disk drives according to the present invention, a magnetic field is established between the cores 134 wound around by the coil 136 of the stator 130 and the permanent magnet 160. Then, the hub 120 rotates about the ball bearing 150. Once the hub 120 rotates, air begins to flow between the hub 120 and the aerodynamic bearing 140, thus forming a layer of air. Most of the load to which this air layer is subjected is thrust load in a non-contact state.

Description will be made in detail below regarding construction of the spindle motor 100 for hard disk drives according to the present invention. First, as shown in FIGS. 4 to 8, the base 110 serves as a lower portion of the spindle motor 100. The base 100 is provided with a seating recess 112 (FIG. 4), which is formed in a concentric concave shape and to a predetermined depth. That is, the concentric seating recess 112 is formed on an upper portion of the base 110 to a predetermined depth.

The base 100, constructed as mentioned above, is provided with the stator 130 and the aerodynamic bearing 140 in a space between the seating recess 112 and the hub 120 rotatably fitted above the base 110. The stator 130 and the aerodynamic bearing 140 will be described below.

The hub 120 rotates by means of a magnetic field established between the coil 136 of the stator 130 and the permanent magnet 160. As shown in FIGS. 4 and 8, the hub 120 is provided with a lower cylindrical section 122 formed with an open lower portion and positioned in the seating recess 112 of the base 110, and a platter mounting section 124 integrally formed on the cylindrical section 122 and mounted with a platter (not shown) called a magnetic disk. Here, the cylindrical section 122 has a smaller outer diameter than the seating recess 112 of the base 110, while the cylindrical section 122 has a larger inner diameter than an outer diameter of the main bearing body 142 of the aerodynamic bearing 140.

The hub 120, constructed as above, is fitted in such a way that the cylindrical section 122 is rotatably positioned in the seating recess 112 of the base 110, without generating mechanical contact between an outer circumferential surface of the cylindrical section 122 and an inner circumferential surface of the seating recess 112, between a lower surface of the cylindrical section 122 and a bottom surface of the seating recess 112, or between an inner circumferential surface of the cylindrical section 122 and an outer circumferential surface of the main bearing body 142 of the aerodynamic bearing 140.

Meanwhile, the hub 120 is provided with a spindle shaft 126, which downwardly extends from the lower surface of the hub 120, i.e., a lower surface of a transition between the platter mounting section and the cylindrical section 122 in a conical form. The spindle shaft 126 is inserted into an inner race of the ball bearing 150. The platter mounting section 124 belonging to the upper portion of the hub 120 is provided with a cavity 124a open in an upward direction, so as to reduce the total weight of the hub 120 as much as possible.

The stator 130 functions to generate a driving force for rotating the hub 120 through a magnetic field, which is established in cooperation with the permanent magnet 160 by a power supply. The stator 130 is fixedly mounted on the auxiliary bearing body 144 of the aerodynamic bearing 140. Therefore, the stator 130 is arranged in the space between the seating recess 112 of the base 110 and the cylindrical section 120 of the hub 120, together with the aerodynamic bearing 140.

The construction of the stator 130, as mentioned above, is provided with a vertically open press-fit portion 132 at the center thereof, and includes a plurality of magnetically inducible cores 134 integrally formed along an outer circumference of the stator at the same angular distance, and a coil 136 wound around each core 134 and establishing a magnetic field in cooperation with the permanent magnet 160 by supplying power to convert each core 134 into an electromagnet.

The stator 130 constructed as mentioned above is not seated in the seating recess 112 of the base 110 by itself, but is positioned in the space between the seating recess 112 of the base 110 and the cylindrical section 122 of the hub 120 after it is firmly fitted on the outer circumferential surface of the auxiliary bearing body 144 of the aerodynamic bearing 140.

The aerodynamic bearing 140 is arranged in the space between the base 110 and the hub 120, establishing aerodynamic pressure in cooperation with the lower surface of the hub 120 while the hub 120 rotates. The aerodynamic bearing 140 includes a disk-shaped main bearing body 142 formed with at least one air groove 142a on the upper surface and/or the outer circumferential surface thereof, and an auxiliary bearing body 144 integrally formed on the lower portion of the main bearing body 142 and fixedly fitted in the seating recess 112 of the base 110 through the open press-fit portion 132a of the stator 130 within the space between the base 110 and the hub 120.

The aerodynamic bearing 140 is fixedly supported in the seating recess 112 of the base 110, as follows: First, the auxiliary bearing body 144 of the aerodynamic bearing 140 is press-fitted into the open press-fit portion 132 of the stator 130 so as to fix the stator 130 on the outer circumferential surface of the auxiliary bearing body 144, and sequentially a bottom surface of the auxiliary bearing body 144 is firmly seated on a bottom surface of the seating recess 112 of the base 110, all being concentrically arranged with respect to each other.

The main bearing body 142 of the aerodynamic bearing 140 as mentioned above has a smaller outer diameter than an inner diameter of the cylindrical section 122 of the hub 120, so that the main bearing body 142 can be fitted so as not to allow contact with the inner circumferential surface of the cylindrical section 122 of the hub 120. Further, the main bearing body 142 of the aerodynamic bearing 140 is fitted so as not to allow the upper surface of the main bearing body 142 to come into contact with the lower surface of the hub 120.

Meanwhile, the air groove 142a, which is formed on the main bearing body 142 of the aerodynamic bearing 140, may be formed on the upper surface of the main bearing body 142 and/or on the outer circumferential surface of the main bearing body 142. It is preferred that the air groove 142a is concentrically formed on the upper surface of the main bearing body 142 and/or that the air groove 142a is mono-directionally formed on the outer circumferential surface of the main bearing body 142.

The ball bearing 150 is used to allow the spindle shaft 126 of the hub 120 to be rotatably supported at the center of the aerodynamic bearing 140. As shown in FIGS. 4 to 8, the ball bearing 150 is fixedly supported in a central through-hole 146, which passes through the rotational center of the aerodynamic bearing 140, in particular of the auxiliary bearing body 144 of the aerodynamic bearing 140.

The spindle shaft 126 projected from the lower surface of the hub 120 is inserted into an inner race of the ball bearing 150. In other words, the spindle shaft 126 of the hub 120 is pivoted in both radial and thrust directions by the ball bearing 150, which comes into direct contact with a lower center of the hub 120, so that during an initial starting (or low-speed rotation) of the spindle motor 100, mechanical contact resulting in starting failure or noise accompanying rotation of the hub 120 is no longer generated between the hub 120 and the aerodynamic bearing 140.

As mentioned above, during an initial starting of the spindle motor 100 (during a low-speed rotation), the spindle shaft 126 of the hub 120 is compensatively supported by the ball bearing 150 in both radial and thrust directions, so that mechanical contact resulting in starting failure or noise accompanying rotation of the hub 120 is not generated between the hub 120 and the aerodynamic bearing 140. As a result, the hub 120 is capable of rotating without deviating from its rotational center.

In contrast, during a high-speed rotation of the spindle motor 100, aerodynamic pressure, which is established between the hub 120 and the aerodynamic bearing 140 through the air groove 142a of the aerodynamic bearing 140, allows most of the thrust load of the hub 120 to be supported on the aerodynamic bearing 140, so that the rotational rigidity of the ball bearing 150 against external disturbance as well as the capability of the hub 120 to rotate without a slant is improved. Therefore, the spindle motor 100 is capable of maintaining a high rotational precision.

As a result, it is possible for the spindle motor 100 of the present invention to rotate at a high speed even though the ball bearing 150 is employed to the spindle motor. That is, when the hub 120 rotates at a low speed, the ball bearing 150 compensatively supports the spindle shaft 126 of the hub 120 in both radial and thrust directions so that the ball bearing 150 is subjected to radial and thrust loads from the hub 120. In contrast, when the hub 120 rotates at a high speed, the aerodynamic bearing 140 supports most of the radial and thrust loads from the hub 120 so that the ball bearing 150 is subjected to a slight level of thrust load from the hub 120, which enables the spindle motor 100 to be rotated at a high speed.

Further, the aforementioned ball bearing 150 is provided at a lower position than the main bearing body 142 of the aerodynamic bearing 140, in particular in the auxiliary bearing body 144, and thus the ball bearing 150 has a rotational supporting point located under the main bearing body 142.

The permanent magnet 160 generates a driving force for rotating the hub 120 by means of magnetic field, which is established between the coil 134 of the stator 130 and the permanent magnet 160 by supplying power. The permanent magnet 160 is fitted on the inner circumferential surface of the hub 120 adjacent to the cores 134, around which the coil 136 of the stator 130 is wound. Therefore, the magnetic field is established between the permanent magnet 160 and the coil 136.

The permanent magnet 160 has an annular ring shape and has a size compatible with the inner diameter of the cylindrical section 122 of the hub 120. So, the permanent magnet 160 is fixedly fitted on the inner circumferential surface of the cylindrical section 122 of the hub 120, which faces toward the cores 134 of the stator 130.

As mentioned above, since the permanent magnet 160 is fixedly fitted on the inner circumferential surface of the cylindrical section 122 of the hub 120, the magnetic field is established between the permanent magnet 160 and the coil 134 of the stator 130 by supplying power, thus rotating the hub 120 in one direction.

In brief, the spindle motor 100 for hard disk drives according to the present invention is designed so that when the hub 120 rotates at a low speed, mechanical contacts resulting in starting failure and noise accompanying rotation of the hub 120 is no longer generated between the hub 120 and the aerodynamic bearing 140, by compensatively supporting the hub 120 in both radial and thrust directions through the ball bearing 150, and when the hub 120 rotates at a high speed, most of the thrust load of the hub 120 is supported on the aerodynamic bearing 140 by establishing aerodynamic pressure between the hub 120 and the aerodynamic bearing 140 through the air groove 142a of the aerodynamic bearing 140. Therefore, the spindle motor 100 is capable of improving the rotational rigidity of the ball bearing 150 against external disturbance as well as the capability of the hub 120 to rotate without a slant, thereby allowing maintenance of a high rotational precision.

Further, the spindle motor 100 for hard disk drives according to the present invention can be constructed so that the ball bearing 150 for rotatably supporting the hub 120 is provided at a lower position than an upper horizontal plane of the main bearing body 142 of the aerodynamic bearing 140, as shown in FIG. 7, so that the ball bearing 150 has a rotatable supporting point under the upper horizontal plane of the main bearing body 142 of the aerodynamic bearing 140.

Here, in order to rotatably mount the hub 120 at the center of the aerodynamic bearing 140 by aid of the ball bearing 150, the ball bearing 150 is fitted in a thrust or vertical direction into the central through-hole 146, which is located under the upper horizontal plane of the main bearing body 142 of the aerodynamic bearing 140 and which is opened vertically at the center of the aerodynamic bearing 140. Further, the spindle shaft 126, which extends downwardly from the lower surface of the hub 120 to take a conical shape, is press-fitted into the inner race of the ball bearing 150. Description will be made regarding various constructions in which the ball bearing 150 for rotatably supporting the hub 120 can be mounted at different positions.

Figure 9:
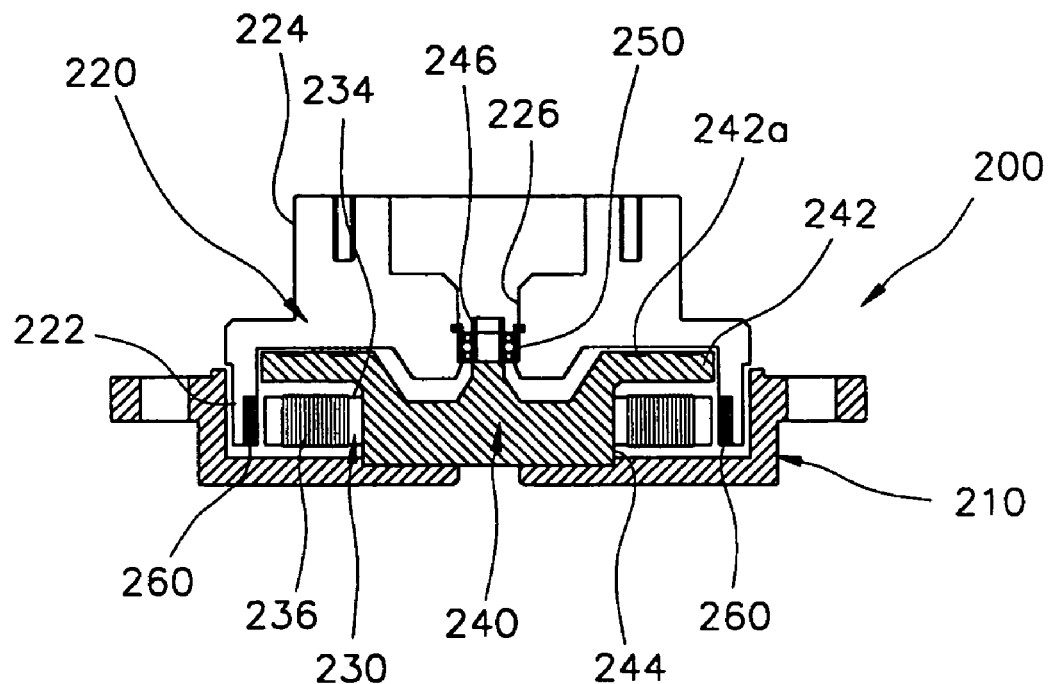
FIG. 9 is a cross-sectional view of a spindle motor for hard disk drives with a pivot structure according to one embodiment of the present invention.
Figure 10:
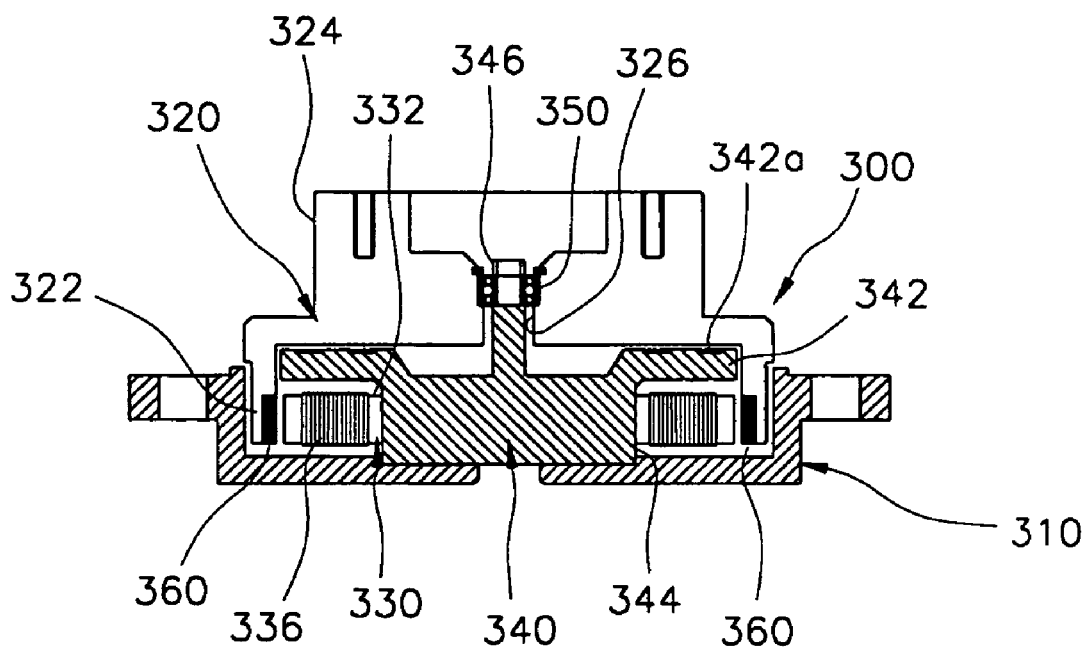
FIG. 10 is a cross-sectional view showing a spindle motor for hard disk drives with a pivot structure according to another embodiment of the present invention.

FIG. 9 is a cross-sectional view of a spindle motor for hard disk drives with a pivot structure according to one embodiment of the present invention, and FIG. 10 is a cross-sectional view showing a spindle motor for hard disk drives with a pivot structure according to another embodiment of the present invention.

First, as shown in FIG. 9, a spindle motor 200 for hard disk drives according to the present invention may be designed to mount a ball bearing 250 for rotatably supporting a hub 220 at a first position, wherein the ball bearing 250 is mounted at the rotational center of the hub 220 flush with an upper horizontal plane of a main bearing body 242 of an aerodynamic bearing 240, and thus the ball bearing 250 has a rotatable supporting point flush with the upper horizontal plane of the main bearing body 242.

As mentioned above, in order to make the rotatable supporting point of the ball bearing 250 flush with the upper horizontal plane of the main bearing body 242, the hub 220 is provided with a central through-hole 226, which is formed to pass through the center of the hub 220 in a vertical direction. Further, the ball bearing 250 is fitted in a thrust or vertical direction into the central through-hole 226, until the ball bearing 250 is flush with the upper horizontal plane of the main bearing body 242 of aerodynamic bearing 240. Finally, the aerodynamic bearing 240 is formed with a upward supporting shaft 246 at the center of the upper surface thereof, and then the supporting shaft 246 is press-fitted into an inner race of the ball bearing 250.

Of course, the spindle motor 200 for hard disk drives shown in FIG. 9 is similar to the spindle motor 100 for hard disk drives shown in FIGS. 4 to 8, in that the combination of the ball bearing 250 with the aerodynamic bearing 240 is made to enable the hub 220 to follow the point-contact supporting construction on the basis of the rotational principle of the whirligig. However, the difference between them is dependent on a position where the ball bearing 250 is mounted.

Meanwhile, as shown in FIG. 10, a spindle motor 300 for hard disk drives according to the present invention may be designed to mount a ball bearing 350 for rotatably supporting a hub 320 at a second position, wherein the ball bearing 350 is mounted at an upper center of the hub 320 at a higher position than an upper horizontal plane of a main bearing body 342 of an aerodynamic bearing 340, and thus the ball bearing 350 has a rotatable supporting point at the higher position than the upper horizontal plane of the main bearing body 342 of the aerodynamic bearing 340.

As mentioned above, in order to provide the rotatable supporting point of the ball bearing 350 at a higher position than the upper horizontal plane of the main bearing body 342 of the aerodynamic bearing 340, the hub 320 is provided with a central through-hole 326, which is formed to pass through the center of the hub 320 in a vertical direction. Further, the ball bearing 350 is fitted in a thrust or vertical direction into the central through-hole 326 so that the ball bearing 350 is positioned at a higher position than the upper horizontal plane of the main bearing body 342 of the aerodynamic bearing 340. Finally, the aerodynamic bearing 340 is formed with a upward long supporting shaft 346 at the center of the upper surface thereof, and then the supporting shaft 346 is press-fitted into an inner race of the ball bearing 350.

Similarly, the spindle motor 300 for hard disk drives shown in FIG. 10 is similar to the spindle motor 100 for hard disk drives shown in FIGS. 4 to 8 and to the spindle motor 200 for hard disk drives shown in FIG. 9, in that combination of the ball bearing 350 with the aerodynamic bearing 340 is made to enable the hub 320 to follow the point-contact supporting construction on the basis of the rotational principle of the whirligig. However, the difference among them is dependent on a position where the ball bearing 350 is mounted.

Figure 11:
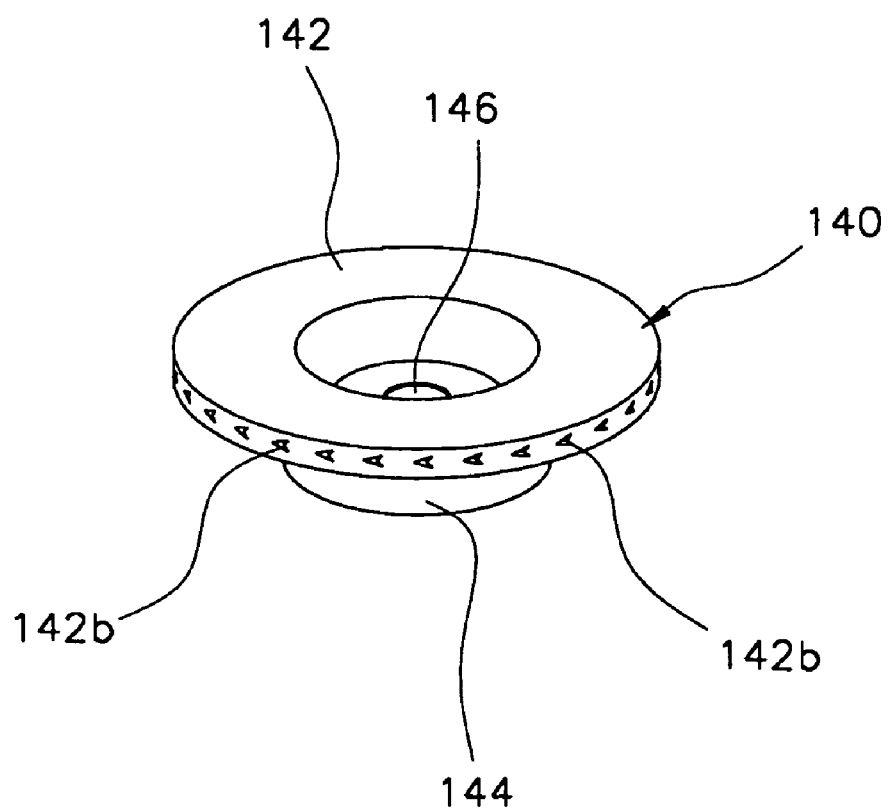
FIG. 11 is a perspective view of a second embodiment for an aerodynamic bearing assembly of a spindle motor with a pivot structure according to the present invention.
Figure 12:
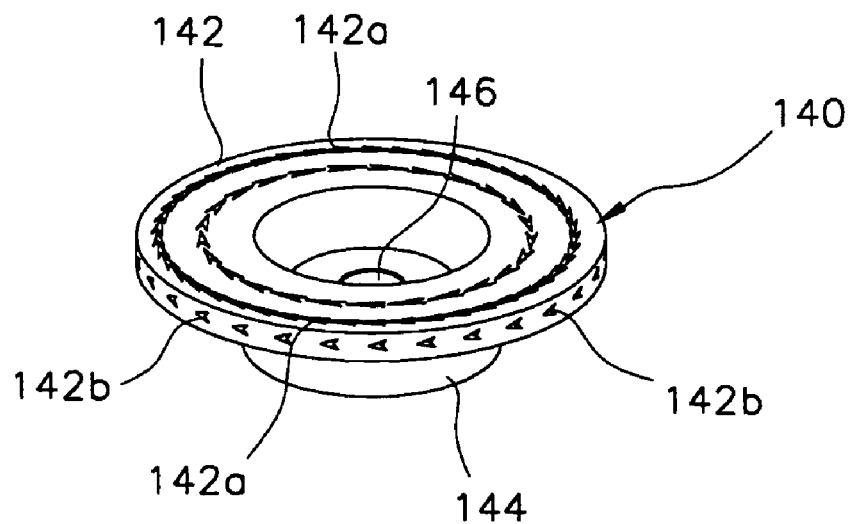
FIG. 12 is a perspective view of a third embodiment for an aerodynamic bearing assembly of a spindle motor with a pivot structure according to the present invention.
Figure 13:
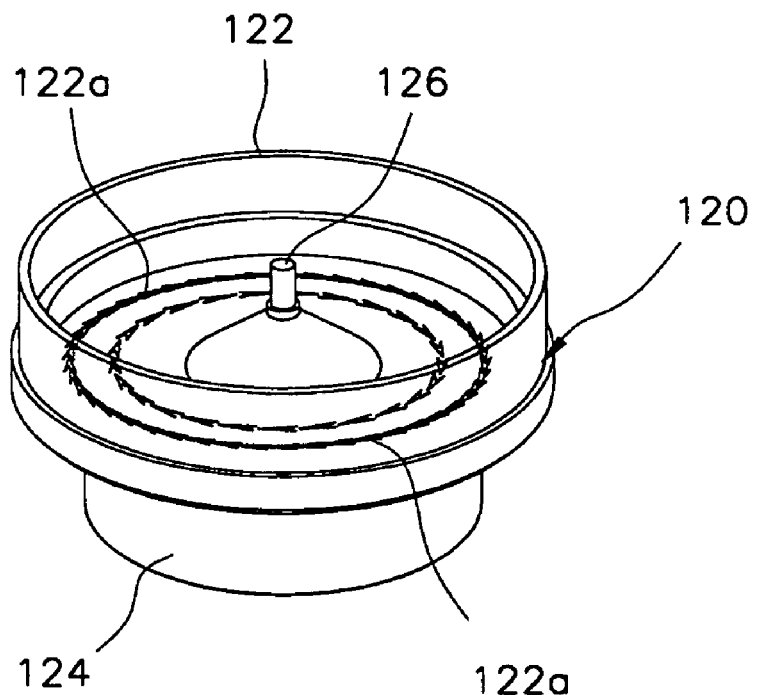
FIG. 13 is a perspective view of a fourth embodiment for an aerodynamic bearing assembly of a spindle motor with a pivot structure according to the present invention.
Figure 14:
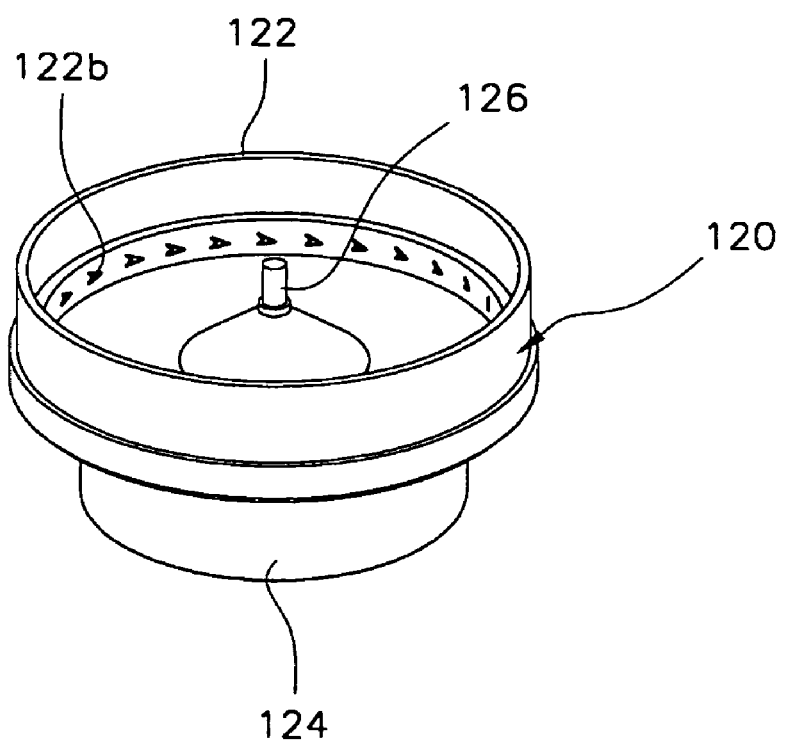
FIG. 14 is a perspective view of a fifth embodiment for an aerodynamic bearing assembly of a spindle motor with a pivot structure according to the present invention.
Figure 15:
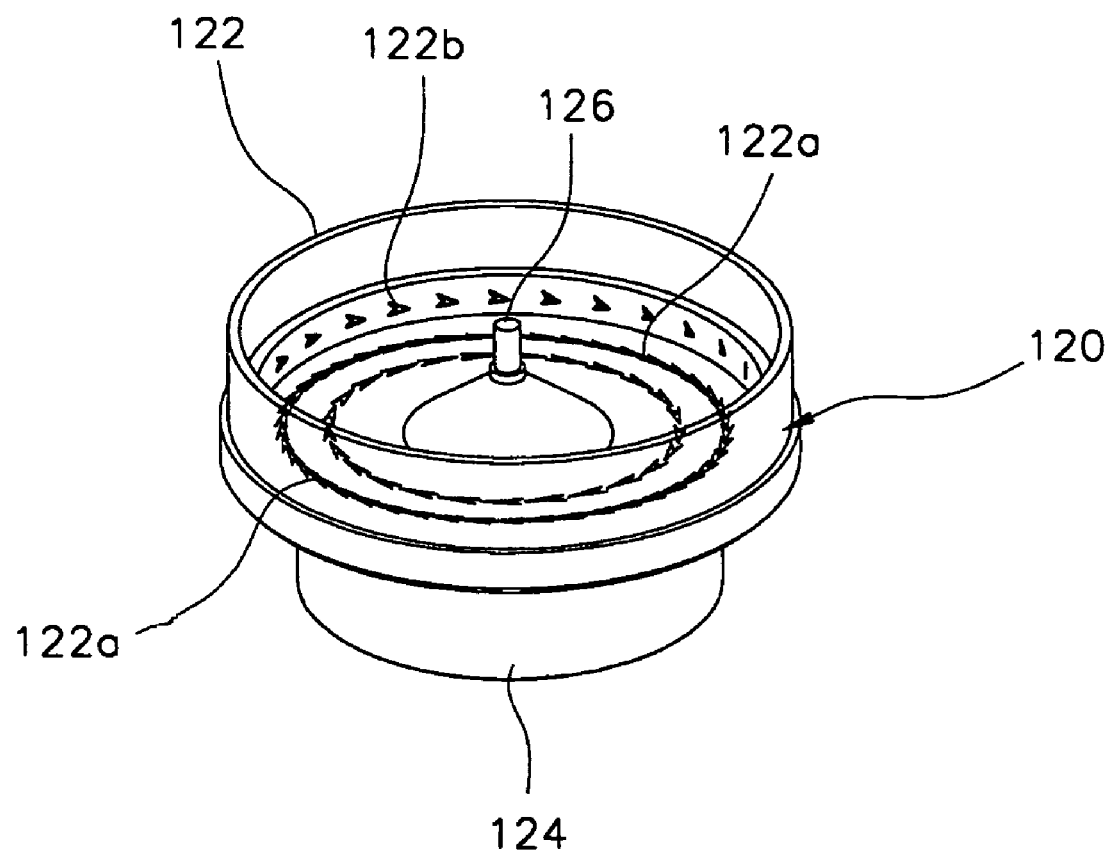
FIG. 15 is a perspective view of a sixth embodiment for an aerodynamic bearing assembly of a spindle motor with a pivot structure according to the present invention.
Figure 16:
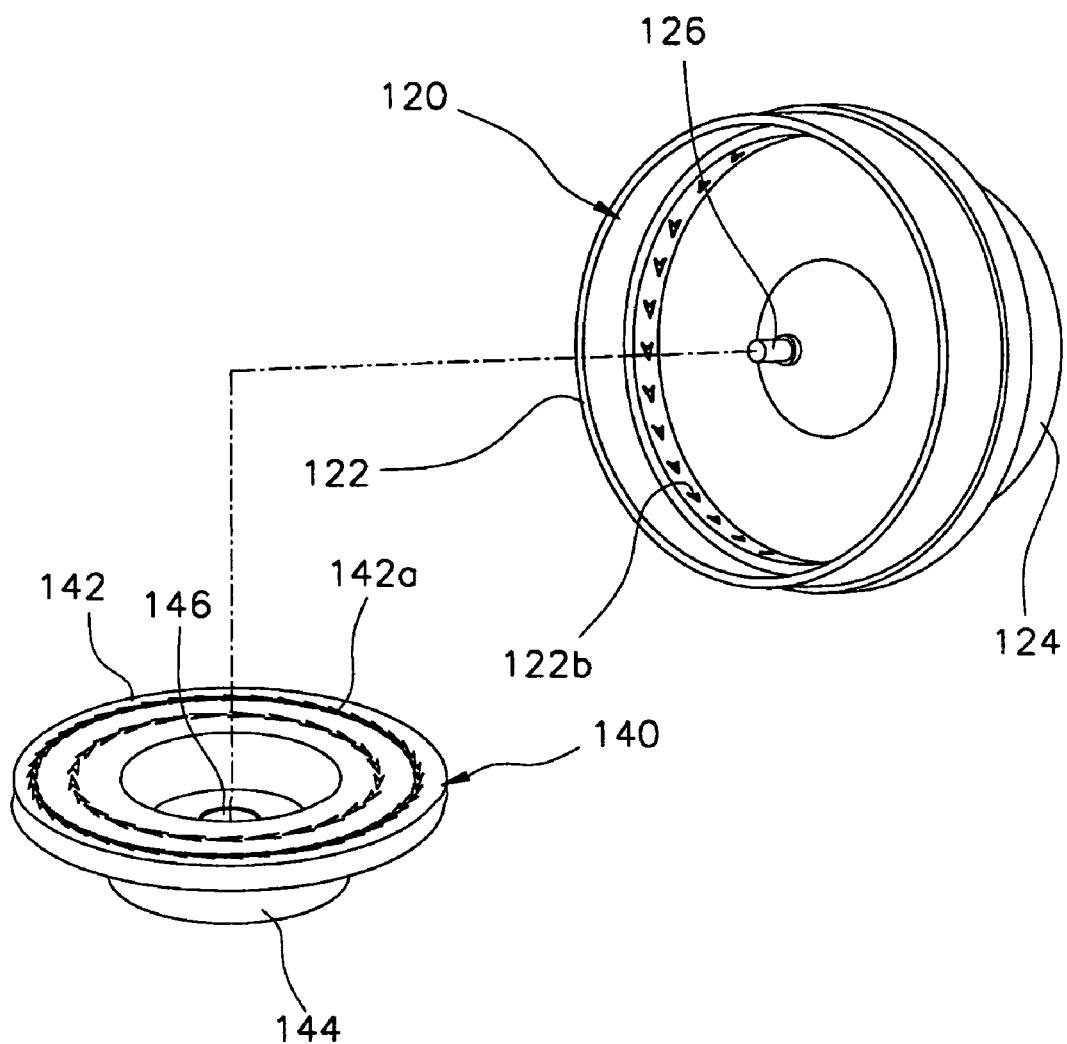
FIG. 16 is a perspective view of a seventh embodiment for an aerodynamic bearing assembly of a spindle motor with a pivot structure according to the present invention.
Figure 17:
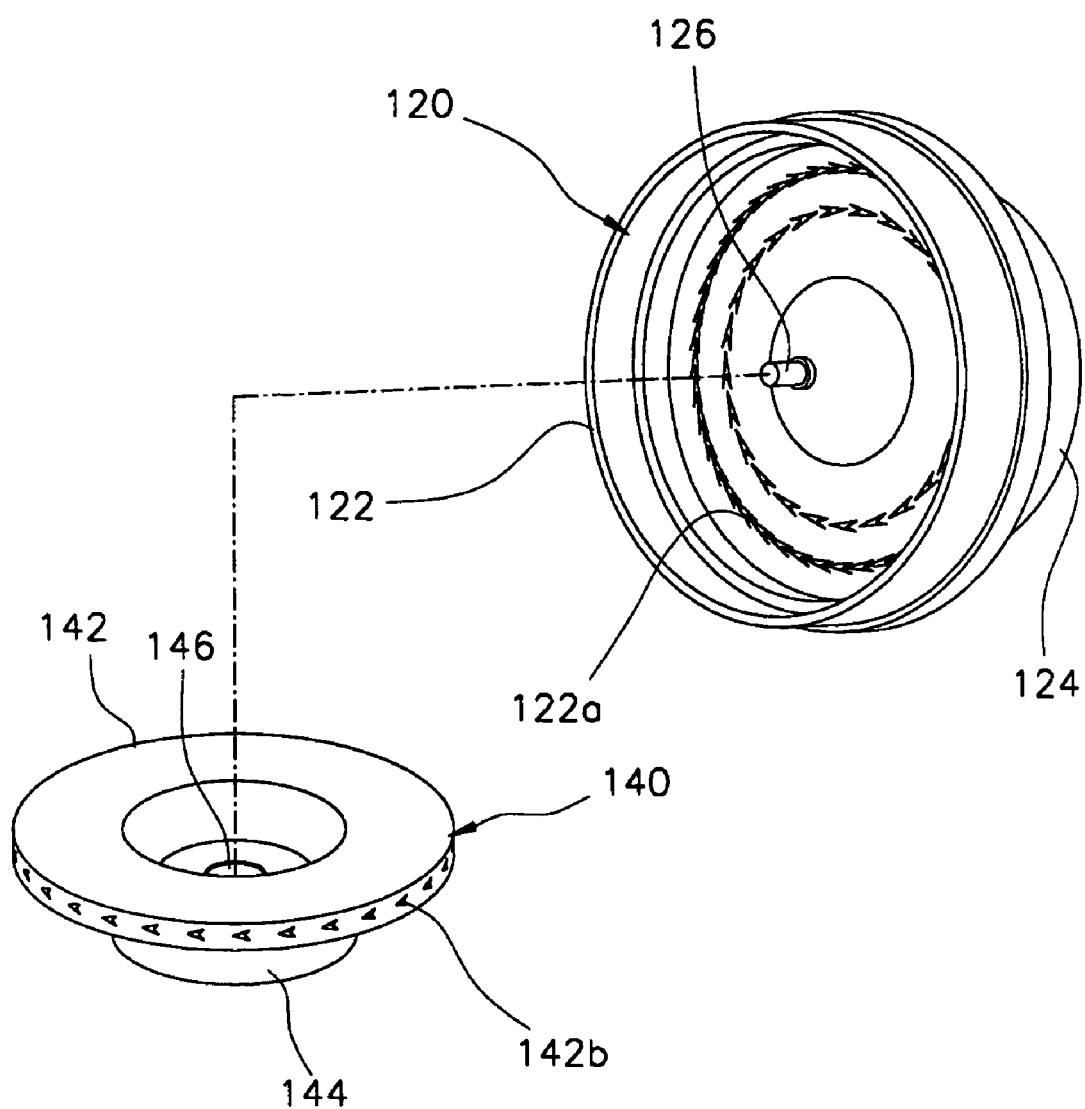
FIG. 17 is a perspective view of an eighth embodiment for an aerodynamic bearing assembly of a spindle motor with a pivot structure according to the present invention.

FIG. 11 is a perspective view of a second embodiment for an aerodynamic bearing assembly of a spindle motor with a pivot structure according to the present invention, FIG. 12 is a perspective view of a third embodiment for an aerodynamic bearing assembly of a spindle motor with a pivot structure according to the present invention, FIG. 13 is a perspective view of a fourth embodiment for an aerodynamic bearing assembly of a spindle motor with a pivot structure according to the present invention, FIG. 14 is a perspective view of a fifth embodiment for an aerodynamic bearing assembly of a spindle motor with a pivot structure according to the present invention, FIG. 15 is a perspective view of a sixth embodiment for an aerodynamic bearing assembly of a spindle motor with a pivot structure according to the present invention, FIG. 16 is a perspective view of a seventh embodiment for an aerodynamic bearing assembly of a spindle motor with a pivot structure according to the present invention, and FIG. 17 is a perspective view of a eighth embodiment for an aerodynamic bearing assembly of a spindle motor with a pivot structure according to the present invention.

FIGS. 11 to 17 illustrate various embodiments for an aerodynamic bearing assembly. First, FIG. 11 shows a construction in that an air groove 142b is provided on an outer circumferential surface of a main bearing body 142 of an aerodynamic bearing 140.

The air groove 142b as shown in FIG. 11 is formed on the outer circumferential surface of the main bearing body 142 instead of the upper horizontal surface of the main bearing body 142 of the aerodynamic bearing 140 as shown in FIG. 8, so that aerodynamic pressure is generated between the outer circumferential surface of the main bearing body 142 and the inner circumferential surface of a cylindrical section 122, which is formed on an lower portion of the hub 120, while the hub 120 rotates. That is, the embodiment in FIG. 11 is a construction in which of an upper horizontal surface of the main bearing body 142 of the aerodynamic bearing 140, an outer circumferential surface of the main bearing body 142 of the aerodynamic bearing 140, a lower horizontal surface of the hub 120 and a lower inner circumferential surface of the hub 120, only the outer circumferential surface of the main bearing body 142 of the aerodynamic bearing 140 is provided with the air groove 142b.

By contrast, FIG. 12 shows a construction in which of an upper horizontal surface of the main bearing body 142 of the aerodynamic bearing 140, an outer circumferential surface of the main bearing body 142 of the aerodynamic bearing 140, a lower horizontal surface of the hub 120 and a lower inner circumferential surface of the hub 120, both the upper horizontal surface and the outer circumferential surface of the main bearing body 142 of the aerodynamic bearing 140 are provided with air grooves 142a and 142b, respectively. The air grooves 142a and 142b, which are formed on the upper horizontal surface and the outer circumferential surface of the main bearing body 142 of the aerodynamic bearing 140, cause aerodynamic pressure to be generated between the upper horizontal surface of the main bearing body 142 and the lower horizontal surface of the cylindrical section 122 of the hub 120 as well as between the outer circumferential surface of the main bearing body 142 and the inner circumferential surface of the cylindrical section 122 of the hub 120, while the hub 120 rotates.

Further, FIG. 13 shows a construction in which of an upper horizontal surface of the main bearing body 142 of the aerodynamic bearing 140, an outer circumferential surface of the main bearing body 142 of the aerodynamic bearing 140, a lower horizontal surface of the hub 120 and a lower inner circumferential surface of the hub 120, the lower horizontal surface of the hub 120 or a lower horizontal surface of a transition between the cylindrical section 122 and a platter mounting section 124 is provided with an air groove 122a. Here, it should be noted that such an air groove is not formed on the aerodynamic bearing 140. The air groove 122*a*, which is formed on the lower horizontal surface of the hub 120, causes aerodynamic pressure to be generated between the upper horizontal surface of the main bearing body 142 of the aerodynamic bearing 140 and the lower horizontal surface of the hub 120, while the hub 120 rotates.

FIG. 14 shows a construction in which of an upper horizontal surface of the main bearing body 142 of the aerodynamic bearing 140, an outer circumferential surface of the main bearing body 142 of the aerodynamic bearing 140, a lower horizontal surface of the hub 120 and a lower inner circumferential surface of the hub 120, the lower inner circumferential surface of the hub 120 is provided with an air groove 122*b*. Here, it should be also noted that such an air groove is not formed on the aerodynamic bearing 140. Therefore, the air groove 122*b*, which is formed on the lower inner circumferential surface of the hub 120, causes aerodynamic pressure to be generated between the outer circumferential surface of the main bearing body 142 of the aerodynamic bearing 140 and the lower inner circumferential surface of the hub 120, while the hub 120 rotates.

FIG. 15 shows a construction in which two among an upper horizontal surface of the main bearing body 142 of the aerodynamic bearing 140, an outer circumferential surface of the main bearing body 142 of the aerodynamic bearing 140, a lower horizontal surface of the hub 120 and a lower inner circumferential surface of the hub 120, e.g., both the lower horizontal surface of the hub 120 and the lower inner circumferential surface of the hub 120, are provided with air grooves 122*a* and 122*b*, respectively. Here, it should be also noted that such air grooves are not formed on the aerodynamic bearing 140. The air grooves 122*a* and 122*b*, which are formed on the lower horizontal surface and the lower inner circumferential surface of the hub 120, cause aerodynamic pressure to be generated between the outer circumferential surface of the main bearing body 142 of the aerodynamic bearing 140 and the lower inner circumferential surface of the hub 120 as well as between the outer circumferential surface of the main bearing body 142 and the lower inner circumferential surface of the hub 120, while the hub 120 rotates.

FIG. 16 shows a construction in which of an upper horizontal surface of the main bearing body 142 of the aerodynamic bearing 140, an outer circumferential surface of the main bearing body 142 of the aerodynamic bearing 140, a lower horizontal surface of the hub 120 and a lower inner circumferential surface of the hub 120, both the upper horizontal surface of the main bearing body 142 of the aerodynamic bearing 140 and the lower inner circumferential surface of the hub 120 are provided with air grooves 142*a* and 122*b*, respectively. Therefore, the air grooves 122*a* and 122*b*, which are formed on the upper horizontal surface of the main bearing body 142 of the aerodynamic bearing 140 and the lower inner circumferential surface of the hub 120, cause aerodynamic pressure to be generated between the upper horizontal surface of the main bearing body 142 of the aerodynamic bearing 140 and the lower horizontal surface of the hub 120 as well as between the outer circumferential surface of the main bearing body 142 and the lower inner circumferential surface of the hub 120, while the hub 120 rotates.

FIG. 17 shows a construction in which of an upper horizontal surface of the main bearing body 142 of the aerodynamic bearing 140, an outer circumferential surface of the main bearing body 142 of the aerodynamic bearing 140, a lower horizontal surface of the hub 120 and a lower inner circumferential surface of the hub 120, both the outer circumferential surface of the main bearing body 142 of the aerodynamic bearing 140 and the lower horizontal surface of the hub 120 are provided with air grooves 142*b* and 122*a*, respectively. Therefore, the air grooves 142*a* and 122*a*, which are formed on the outer circumferential surface of the main bearing body 142 of the aerodynamic bearing 140 and the lower horizontal surface of the hub 120, cause aerodynamic pressure to be generated between the outer circumferential surface of the main bearing body 142 of the aerodynamic bearing 140 and the lower inner circumferential surface of the hub 120 as well as between the upper horizontal surface of the main bearing body 142 and the lower horizontal surface of the hub 120, while the hub 120 rotates.

The construction of the air groove(s) for implementing each embodiment shown in FIGS. 1 to 17, as mentioned above, is different from that shown in FIGS. 1 to 8, but its operation shown in FIGS. 1 to 17 is the same as that shown in FIGS. 1 to 8.

Figure 18:
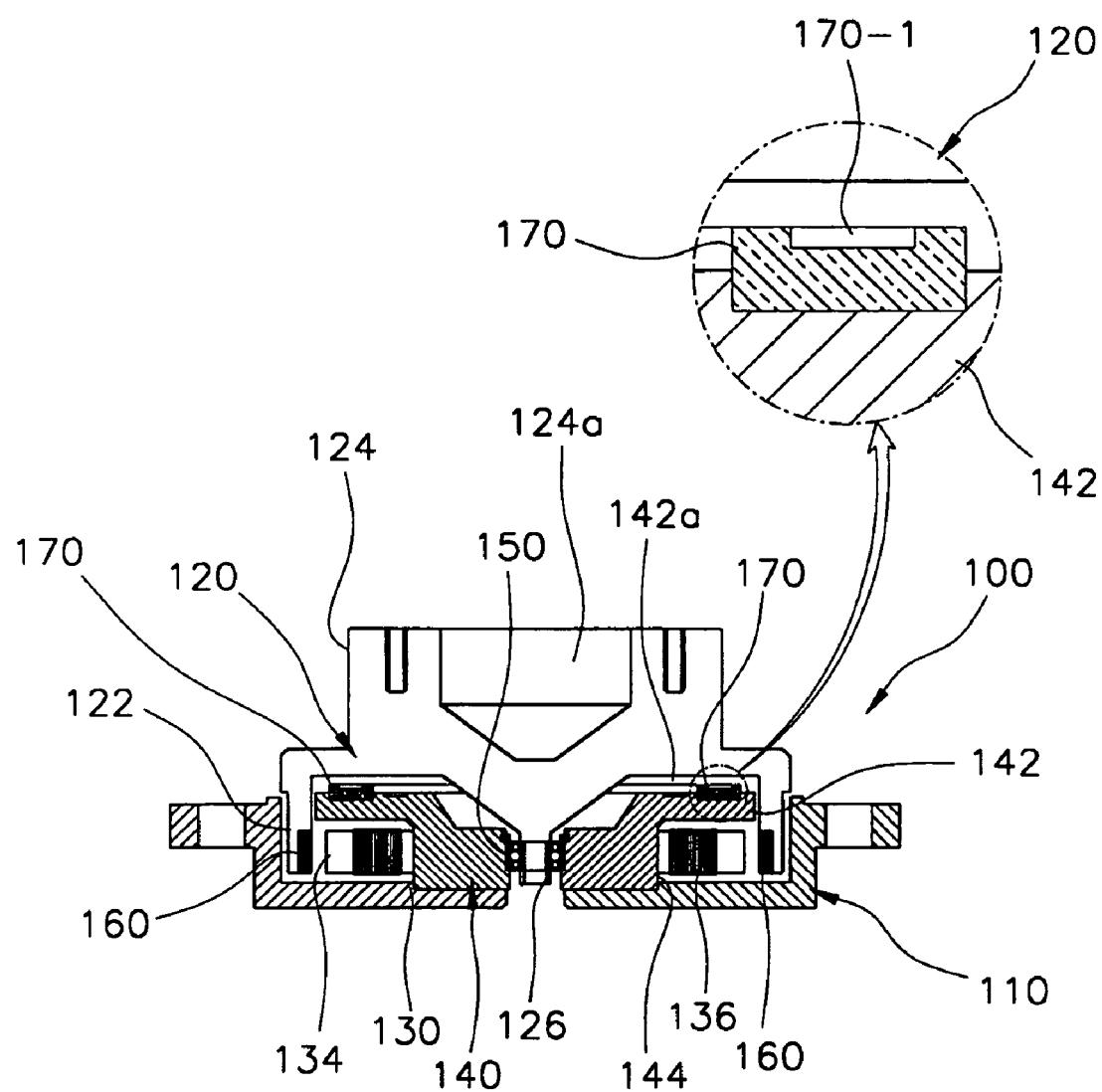
FIG. 18 is a cross-sectional view of a ninth embodiment for an aerodynamic bearing assembly of a spindle motor with a pivot structure according to the present invention.
Figure 19:
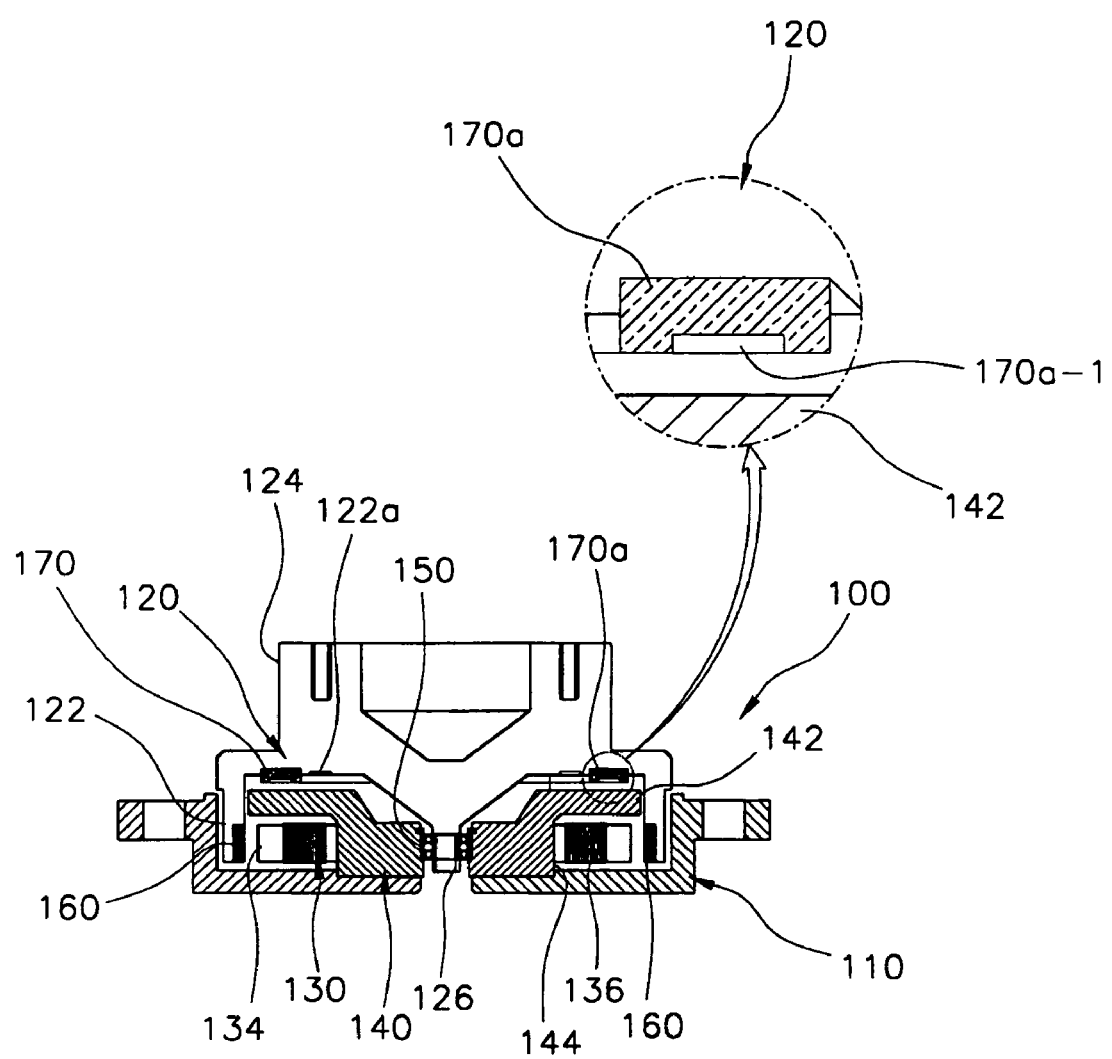
FIG. 19 is a cross-sectional view of a tenth embodiment for an aerodynamic bearing assembly of a spindle motor with a pivot structure according to the present invention.
Figure 20:
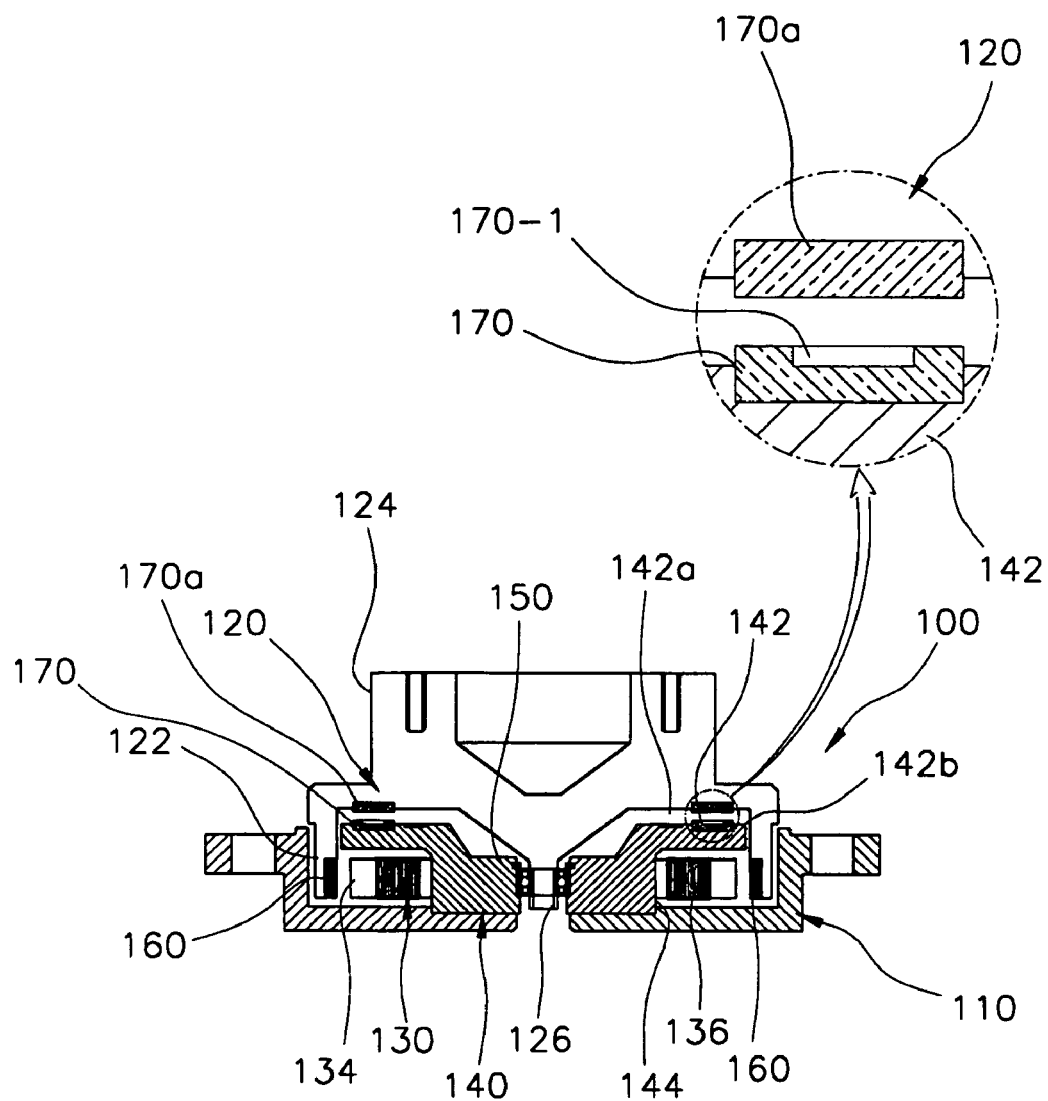
FIG. 20 is a cross-sectional view of an eleventh embodiment for an aerodynamic bearing assembly of a spindle motor with a pivot structure according to the present invention.

FIG. 18 is a cross-sectional view of a ninth embodiment for an aerodynamic bearing assembly of a spindle motor with a pivot structure according to the present invention, FIG. 19 is a cross-sectional view of a tenth embodiment for an aerodynamic bearing assembly of a spindle motor with a pivot structure according to the present invention, and FIG. 20 is a cross-sectional view of an eleventh embodiment for an aerodynamic bearing assembly of a spindle motor with a pivot structure according to the present invention.

In FIGS. 18 to 20, there is shown a construction for minimizing friction between a lower horizontal surface of a hub 120 and an upper horizontal surface of a main bearing body 142 of the aerodynamic bearing 140 during an initial starting. First, as shown in FIG. 18, the upper horizontal surface of the main bearing body 142 of the aerodynamic bearing 140 is provided with an oilless bearing 170, which takes a ring shape.

The oilless bearing 170 constructed, as mentioned above, is mounted on the upper horizontal surface of the main bearing body 142 and is spaced apart from the lower horizontal surface of the hub 120 by a predetermined interval, so that friction between the lower horizontal surface of the hub 120 and the upper horizontal surface of the main bearing body 142 is minimized by preventing the hub 120 from being declined during an initial starting of the spindle motor 100. In this way, by prevention of the declination of the hub 120 and thus minimizing the friction between the lower horizontal surface of the hub 120 and the upper horizontal surface of the main bearing body 142, mechanical contact resulting in noise and starting failure can be eliminated.

Further, the oilless bearing 170 mounted on the upper horizontal surface of the main bearing body 142 of the aerodynamic bearing 140 may be provided with an air groove 170-1, for example on the upper surface of the oilless bearing facing to the lower horizontal surface of the hub 120.

It goes without saying that the oilless bearing 170 shown in FIG. 18 may be employed in the spindle motor in which the upper horizontal surface of the main bearing body 142 of the aerodynamic bearing 140 is provided with the air groove 142*a* shown in FIG. 8, or in the spindle motor 100 in which the outer circumferential surface of the main bearing body 142 of the aerodynamic bearing 140 is provided with the air groove 142*b* shown in FIG. 11, or in the spindle motor 100 in which both the upper horizontal surface and the outer circumferential surface of the main bearing body 142 of the aerodynamic bearing 140 are provided with the air grooves 142a and 142b, respectively, shown in FIG. 12.

Similarly, it is natural that the oilless bearing 170 shown in FIG. 18 may be employed in the spindle motor 100 in which the lower horizontal surface of the hub 120 is provided with the air groove 122a shown in FIG. 13, or in the spindle motor 100 in which the inner circumferential surface of the cylindrical section 122 of the hub 120 is provided with the air groove 122b shown in FIG. 14, or in the spindle motor 100 in which both the lower horizontal surface of the hub 120 and the inner circumferential surface of the cylindrical section 122 of the hub 120 are provided with the air grooves 122a and 122b, respectively, shown in FIG. 15, or in the spindle motor 100 in which both the upper horizontal surface of the main bearing body 142 of the aerodynamic bearing 140 and the inner circumferential surface of the cylindrical section 122 of the hub 120 are provided with the air grooves 142a and 122b, respectively, shown in FIG. 16, or in the spindle motor 100 in which both the outer circumferential surface of the main bearing body 142 of the aerodynamic bearing 140 and the lower horizontal surface of the hub 120 are provided with the air grooves 142b and 122a, respectively, shown in FIG. 17.

FIG. 19 shows a construction in which the lower horizontal surface of the hub 120 is provided with an oilless bearing 170a in a ring shape, unlike the construction of FIG. 18 in which the upper horizontal surface of the main bearing body 142 of the aerodynamic bearing 140 is provided with an oilless bearing 170 in a ring shape. This oilless bearing 170a, constructed as mentioned above, is mounted on the lower horizontal surface of the hub 120 and is spaced apart from the upper horizontal surface of the main bearing body 142 at a predetermined interval, so that friction between the lower horizontal surface of the hub 120 and the upper horizontal surface of the main bearing body 142 is minimized by preventing the hub 120 from being declined during an initial starting of the spindle motor 100. In this way, by prevention of the declination of the hub 120 and thus minimizing the friction between the lower horizontal surface of the hub 120 and the upper horizontal surface of the main bearing body 142, mechanical contact resulting in noise and starting failure can be eliminated. Here, the oilless bearing 170a mounted on the lower horizontal surface of the hub 120 may be provided with an air groove 170a-1, for example on the lower surface of the oilless bearing facing to the upper horizontal surface of the main bearing body 142 of the aerodynamic bearing 140.

Meanwhile, the oilless bearing 170a mounted on the lower horizontal surface of the hub 120, as shown in FIG. 19, may be employed in the spindle motor in which the upper horizontal surface of the main bearing body 142 of the aerodynamic bearing 140 is provided with the air groove 142a as shown in FIG. 8, or in the spindle motor 100 in which the outer circumferential surface of the main bearing body 142 of the aerodynamic bearing 140 is provided with the air groove 142b as shown in FIG. 11, or in the spindle motor 100 in which both the upper horizontal surface and the outer circumferential surface of the main bearing body 142 of the aerodynamic bearing 140 are provided with the air grooves 142a and 142b, respectively, as shown in FIG. 12.

Similarly, it will be apparent to those in the art that the oilless bearing 170a mounted on the lower horizontal surface of the hub 120 as shown in FIG. 19 may be employed in the spindle motor 100 in which the lower horizontal surface of the hub 120 is provided with the air groove 122a, as shown in FIG. 13, or in the spindle motor 100 in which the inner circumferential surface of the cylindrical section 122 of the hub 120 is provided with the air groove 122b, as shown in FIG. 14, or in the spindle motor 100 in which both the lower horizontal surface of the hub 120 and the inner circumferential surface of the cylindrical section 122 of the hub 120 are provided with the air grooves 122a and 122b, respectively, as shown in FIG. 15, or in the spindle motor 100 in which both the upper horizontal surface of the main bearing body 142 of the aerodynamic bearing 140 and the inner circumferential surface of the cylindrical section 122 of the hub 120 are provided with the air grooves 142a and 122b, respectively, as shown in FIG. 16, or in the spindle motor 100 in which both the outer circumferential surface of the main bearing body 142 of the aerodynamic bearing 140 and the lower horizontal surface of the hub 120 are provided with the air grooves 142b and 122a, respectively, as shown in FIG. 17.

FIG. 20 shows a construction in which both the upper horizontal surface of the main bearing body 142 of the aerodynamic bearing 140 and the lower horizontal surface of the hub 120 are provided with oilless bearings 170 and 170a opposite to each other in a ring shape. These oilless bearings 170 and 170a are spaced apart from each other at a predetermined interval, so that friction between the lower horizontal surface of the hub 120 and the upper horizontal surface of the main bearing body 142 is minimized by preventing the hub 120 from being declined during an initial starting of the spindle motor 100. Consequently, by prevention of the declination of the hub 120 and the resulting minimization of the friction between the lower horizontal surface of the hub 120 and the upper horizontal surface of the main bearing body 142, mechanical contact resulting in noise and starting failure can be eliminated.

Here, any one of two oilless bearings 170 and 170a may be provided with an air groove 170-1 or 170a-1. For example, the air groove 170-1 may be formed on the upper surface of the oilless bearing 170, which is mounted on the upper horizontal surface of the main bearing body 142 of the aerodynamic bearing 140, or the air groove 170a-1 may be formed on the lower surface of the oilless bearing facing 170a, which is mounted on the lower horizontal surface of the hub 120.

Meanwhile, these oilless bearings 170 and 170a as shown in FIG. 20 may be also employed in the spindle motor 100 in which the upper horizontal surface of the main bearing body 142 of the aerodynamic bearing 140 is provided with the air groove 142a as shown in FIG. 8, or in the spindle motor 100 in which the outer circumferential surface of the main bearing body 142 of the aerodynamic bearing 140 is provided with the air groove 142b, as shown in FIG. 11, or in the spindle motor 100 in which both the upper horizontal surface and the outer circumferential surface of the main bearing body 142 of the aerodynamic bearing 140 are provided with the air grooves 142a and 142b, respectively, as shown in FIG. 12.

Similarly, it will be easily understood to those in the art that the oilless bearings 170 and 170a may be employed in the spindle motor 100 in which the lower horizontal surface of the hub 120 is provided with the air groove 122a, as shown in FIG. 13, or in the spindle motor 100 in which the inner circumferential surface of the cylindrical section 122 of the hub 120 is provided with the air groove 122b, as shown in FIG. 14, or in the spindle motor 100 in which both the lower horizontal surface of the hub 120 and the inner circumferential surface of the cylindrical section 122 of the hub 120 are provided with the air grooves 122a and 122b, respectively, as shown in FIG. 15, or in the spindle motor 100 in which both the upper horizontal surface of the main bearing body 142 of the aerodynamic bearing 140 and the inner circumferential surface of the cylindrical section 122 of the hub 120 are provided with the air grooves 142*a* and 122*b*, respectively, as shown in FIG. 16, or in the spindle motor 100 in which both the outer circumferential surface of the main bearing body 142 of the aerodynamic bearing 140 and the lower horizontal surface of the hub 120 are provided with the air grooves 142*b* and 122*a*, respectively, as shown in FIG. 17.

According to the present invention as mentioned above, the hub, a rotatable object, of the spindle motor for hard disk drives is not only pivoted in both radial and thrust directions by the ball bearing, which comes into direct contact with the center of the hub, so as to perform rotation according to the rotational principle of the whirligig, but also is subjected to the thrust load through the aerodynamic bearing assembly with the air groove(s) without being in contact with it, so that mechanical contacts resulting in noise and starting failure of the aerodynamic bearing assembly and/or the hub can be prevented during an initial starting (during a low-speed rotation), and thus the hub can maintain an excellent rotational precision.

While this invention has been described in connection with what are presently considered to be the most practical and preferred embodiments, it is to be understood that the invention is not limited to the disclosed embodiment and the drawings, but, on the contrary, it is intended to cover various modifications and variations within the spirit and scope of the appended claims.

According to the present invention as mentioned above, the rotatable hub of the spindle motor for hard disk drives is designed not only to be pivoted in both radial and thrust directions by the ball bearing, which comes into direct contact with the center of the hub, so as to perform rotation according to the rotational principle of the whirligig, but also to be subjected to the thrust load through the aerodynamic bearing assembly with the air groove(s) without being in contact with it, so that the hub can maintain a rotational center without mechanical contact resulting in noise and starting failure of the aerodynamic bearing assembly during an initial starting (during low-speed rotation).

Further, according to the present invention as mentioned above, the hub, which is designed to have a conical structure like a whirligig and thus to have a rotatable point-contact supporting structure through the ball bearing is combined with the aerodynamic bearing with at least one air groove, which is formed on at least one of the upper horizontal surface of the main bearing body of the aerodynamic bearing, the outer circumferential surface of the main bearing body of the aerodynamic bearing, the lower horizontal surface of the hub and the inner circumferential surface of the cylindrical section of the hub, so that rotational rigidity of the bearing against disturbance as well as its capability of rotating without a slant is improved, and thus an excellent rotational precision can be obtained.

In addition, according to the present invention, the hub is designed to have a conical structure like a whirligig and thus to have a rotatable point-contact supporting structure through the ball bearing, so that even though static electricity is generated by friction between the air caused by a high-speed rotation and the platter, the static electricity can be discharged through the ball bearing. Therefore, structural safety of the spindle motor can be improved.

What is claimed:

1. An aerodynamic bearing assembly employed in a spindle motor for hard disk drives, the spindle motor including a base, a hub, a stator and a permanent magnet, the base serving as a lower portion of the spindle motor, the hub being rotatably fitted on the base and able to fixedly mount a platter, the stator being formed with a plurality of cores wound around by at least one coil along an outer circumference of the stator and being formed with an open press-fit portion at a center of the stator, the permanent magnet being fitted on an inner circumferential surface of the hub and generating a magnetic field in cooperation with the coil, the aerodynamic bearing assembly comprising:

an aerodynamic bearing including a main bearing body formed in a concentric disk shape to serve as an upper portion of the aerodynamic bearing, and an auxiliary bearing body integrally formed on a lower portion of the main bearing body and press-fitted into an open press-fit portion of the stator to fixedly mount the stator on an outer circumferential surface of the auxiliary bearing body, the aerodynamic bearing being fixedly installed in a space between the base and the hub; and a ball bearing for rotatably supporting a center of the hub in both radial and thrust directions at a rotational center of the aerodynamic bearing, wherein at least one of an upper horizontal surface of the main bearing body of the aerodynamic bearing, an outer circumferential surface of the main bearing body of the aerodynamic bearing, a lower horizontal surface of the hub and a lower inner circumferential surface of the hub, is provided with at least one air groove having a predetermined depth, the air groove generating aerodynamic pressure between the hub and the aerodynamic bearing while the hub rotates.

2. An aerodynamic bearing assembly as claimed in claim 1, wherein the air groove is formed on the upper horizontal surface of the main bearing body of the aerodynamic bearing to generate aerodynamic pressure between the lower horizontal surface of the hub and the upper horizontal surface of the main bearing body of the aerodynamic bearing.

3. An aerodynamic bearing assembly as claimed in claim 1, wherein the air groove is formed on the outer circumferential surface of the main bearing body of the aerodynamic bearing to generate aerodynamic pressure between the lower inner circumferential surface of the hub and the outer circumferential surface of the main bearing body of the aerodynamic bearing.

4. An aerodynamic bearing assembly as claimed in claim 1, wherein the air groove is formed both on the upper horizontal surface of the main bearing body of the aerodynamic bearing and on the outer circumferential surface of the main bearing body of the aerodynamic bearing to generate aerodynamic pressure between the lower horizontal surface of the hub and the upper horizontal surface of the main bearing body of the aerodynamic bearing and between the lower inner circumferential surface of the hub and the outer circumferential surface of the main bearing body of the aerodynamic bearing.

5. An aerodynamic bearing assembly as claimed in claim 1, wherein the air groove is formed on the lower horizontal surface of the hub to generate aerodynamic pressure between the lower horizontal surface of the hub and the upper horizontal surface of the main bearing body of the aerodynamic bearing.

6. An aerodynamic bearing assembly as claimed in claim 1, wherein the air groove is formed on the lower inner circumferential surface of the hub to generate aerodynamic pressure between the lower inner circumferential surface of the hub and the outer circumferential surface of the main bearing body of the aerodynamic bearing.

7. An aerodynamic bearing assembly as claimed in claim 1, wherein the air groove is formed both on the lower horizontal surface of the hub and on the lower inner circumferential surface of the hub to generate aerodynamic pressure between the lower horizontal surface of the hub and the upper horizontal surface of the aerodynamic bearing and between the lower inner circumferential surface of the hub and the outer circumferential surface of the main bearing body of the aerodynamic bearing.

8. An aerodynamic bearing assembly as claimed in claim 1, wherein the air groove is formed both on the upper horizontal surface of the main bearing body of the aerodynamic bearing and on the lower inner circumferential surface of the hub to generate aerodynamic pressure between the lower horizontal surface of the hub and the upper horizontal surface of the main bearing body of the aerodynamic bearing and between the lower inner circumferential surface of the hub and between the outer circumferential surface of the main bearing body of the aerodynamic bearing.

9. An aerodynamic bearing assembly as claimed in claim 1, wherein the air groove is formed both on the outer circumferential surface of the main bearing body of the aerodynamic bearing and on the lower horizontal surface of the hub to generate aerodynamic pressure between the lower inner circumferential surface of the hub and between the outer circumferential surface of the main bearing body of the aerodynamic bearing and between the lower horizontal surface of the hub and the upper horizontal surface of the main bearing body of the aerodynamic bearing.

10. An aerodynamic bearing assembly as claimed in claim 1, further comprising at least one oilless bearing, formed on the upper horizontal surface of the main bearing body of the aerodynamic bearing in a ring shape.

11. An aerodynamic bearing assembly as claimed in claim 10, wherein the oilless bearing is provided with an air groove of a predetermined depth on an upper surface thereof.

12. An aerodynamic bearing assembly as claimed in claim 1, further comprising at least one oilless bearing, formed on the lower horizontal surface of the hub in a ring shape.

13. An aerodynamic bearing assembly as claimed in claim 12, wherein the oilless bearing is provided with an air groove of a predetermined depth on a lower surface thereof.

14. An aerodynamic bearing assembly as claimed in claim 1, further comprising at least one pair of oilless bearings opposite to each other, formed on the upper horizontal surface of the main bearing body of the aerodynamic bearing and on the lower horizontal surface of the hub in a ring shape.

15. An aerodynamic bearing assembly as claimed in claim 14, wherein of the opposite oilless bearings, one, which is mounted on the upper horizontal surface of the main bearing body of the aerodynamic bearing, is provided with an air groove on an upper surface thereof.

16. An aerodynamic bearing assembly as claimed in claim 14, wherein of the opposite oilless bearings, one, which is mounted on the lower horizontal surface of the hub, is provided with an air groove on a lower surface thereof.

17. An aerodynamic bearing assembly as claimed in claim 1, wherein the ball bearing for rotatably supporting the hub is arranged to be at a lower position than an upper horizontal plane of the main bearing body of the aerodynamic bearing, so that the ball bearing has a rotatable supporting point at a lower position than the upper horizontal plane of the main bearing body of the aerodynamic bearing.

18. An aerodynamic bearing assembly as claimed in claim 1, wherein the ball bearing for rotatably supporting the hub is arranged to be flush with an upper horizontal plane of the main bearing body of the aerodynamic bearing, so that the ball bearing has a rotatable supporting point flush with the upper horizontal plane of the main bearing body of the aerodynamic bearing.

19. An aerodynamic bearing assembly as claimed in claim 1, wherein the ball bearing for rotatably supporting the hub is arranged to be at a higher position than an upper horizontal plane of the main bearing body of the aerodynamic bearing, so that the ball bearing has a rotatable supporting point at a higher position than the upper horizontal plane of the main bearing body of the aerodynamic bearing.

* * * * *